US006778730B2

(12) United States Patent
Hironishi

(10) Patent No.: US 6,778,730 B2
(45) Date of Patent: Aug. 17, 2004

(54) OPTICAL SIGNAL PROCESSING DEVICE

(75) Inventor: Kazuo Hironishi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 125 days.

(21) Appl. No.: 09/804,152

(22) Filed: Mar. 13, 2001

(65) Prior Publication Data

US 2002/0044723 A1 Apr. 18, 2002

(30) Foreign Application Priority Data

Aug. 31, 2000 (JP) ........................ 2000-264186

(51) Int. Cl.[7] .............................................. H04B 10/02

(52) U.S. Cl. ............................ 385/24; 385/3; 359/348; 398/154; 398/155; 398/173; 398/175; 398/177

(58) Field of Search ...................... 385/3, 24; 359/158, 359/173–179, 140; 398/154, 155, 173, 175, 177

(56) References Cited

U.S. PATENT DOCUMENTS

| 4,747,094 A | * | 5/1988 | Sakaguchi et al. | 359/138 |
| 5,109,449 A | * | 4/1992 | Newberg et al. | 385/46 |
| 5,467,213 A | * | 11/1995 | Kaede et al. | 359/175 |
| 5,646,774 A | * | 7/1997 | Takara et al. | 359/340 |
| 6,104,515 A | * | 8/2000 | Cao | 359/161 |
| 6,396,607 B1 | * | 5/2002 | Cao | 359/158 |

FOREIGN PATENT DOCUMENTS

| JP | 8-288902 | 1/1996 |
| JP | 08251113 A | 9/1996 |

OTHER PUBLICATIONS

Leclerc, et al., "Simultaneously regenerated 4 ' 40 Gbit/s dense WDM transmission over 10,000km using single 40 GHz InP Mach–Zehnder Modulator", Electronics Letters, Aug. 31, 2000, vol. 36, No. 18, pp. 1574–1575.

Leclerc et al., "Dense WDM (0.27bit/s/Hz) 4=40 Gbit/s dispersion–managed transmission over 10,000km with in–line optical regeneration by channel pairs", Electronics Letters, Feb. 17, 2000, vol. 36, No. 4, pp. 337–338.

Leclerc, et al., "Optical 3R Regeneration Towards Multi–Terabit/s Undersea Systems", ECOC'99, Sep. 26–30, 1999, Nice, France, pp. II–282–II–285.

(List continued on next page.)

Primary Examiner—Toan Ton
Assistant Examiner—Michael H Caley
(74) Attorney, Agent, or Firm—Staas & Halsey LLP

(57) ABSTRACT

Disclosed herein is an optical signal processing device which can give stable temporal order to the modulation-phases of a plurality of optical signals. The optical signal processing device includes an optical demultiplexer and an optical multiplexer for adaptation to WDM (wavelength division multiplexing). The optical demultiplexer has an input port and a plurality of output ports. The input port is adapted to accept WDM signal light obtained by wavelength division multiplexing a plurality of optical signals having different wavelengths. The optical multiplexer has an output port and a plurality of input ports. The plural output ports of the optical demultiplexer and the plural input ports of the optical multiplexer are connected by a plurality of optical paths, respectively. Each optical path is provided with a delay adjuster. The modulation-phase of at least one of the plurality of optical signals is detected by a detector, and the delay adjuster is controlled by a controller according to the modulation-phase detected by the detector. Accordingly, the modulation-phases of all the optical signals can be easily made to coincide with each other.

11 Claims, 22 Drawing Sheets

OTHER PUBLICATIONS

Leclerc, et al., "Demonstration of High Robustness to SNR impairment in 20 Gbit/s long–haul transmission using 1.5$\mu$m Saturable Absorber", Electronics Letters, Nov. 9, 2000, vol. 36, No. 23, pp. 1944–1946.

Hirano, et al., "10 GBIT/s All–Optical Pulse Discriminator Using a High–Speed Saturable Absorber Optical Gate", ECOC'97, Sep. 22–25, 1997, Conference Publication No. 448, pp. 86–89.

* cited by examiner

INPUT TO SGD

OUTPUT FROM SGD

INPUT TO SA

OUTPUT FROM SA

OPTICAL SIGNAL PROCESSING DEVICE

BACKGROUND OF THE INVENTION

1. Field of the Invention

The present invention relates to an optical signal processing device suitable for all-optical regenerative repeat.

2. Description of the Related Art

A Mach-Zehnder interferometer (MZI) type optical gate is known as a conventional waveform shaping device for performing waveform shaping at the optical level. This optical gate is configured by integrating a Mach-Zehnder interferometer including first and second nonlinear optical media each for providing a phase shift on an optical waveguide substrate, for example. Probe light as continuous wave (CW) light is equally divided into two components, which are in turn supplied to the first and second nonlinear optical media. The optical path length of the interferometer is set so that output light is not obtained by interference of the two components of the probe light.

An optical signal is further supplied to one of the first and second nonlinear optical media. By properly setting the powers of the optical signal and the probe light, a converted optical signal synchronous with the optical signal is output from the optical gate. The converted optical signal has the same wavelength as that of the probe light.

It has been proposed to use a semiconductor optical amplifier (SOA) as each of the first and second nonlinear optical media. For example, an InGaAs-SOA having opposite end faces treated with antireflection coatings is used as each nonlinear optical medium in a 1.5 μm band, and these nonlinear optical media are integrated on an InP/GaInAsP substrate to fabricate an optical gate.

A nonlinear optical loop mirror (NOLM) is known as another conventional waveform shaping device. The NOLM includes a first optical coupler including first and second optical paths directionally coupled to each other, a loop optical path for connecting the first and second optical paths, and a second optical coupler including a third optical path directionally coupled to the loop optical path.

By forming a part or the whole of the loop optical path from a nonlinear optical medium and supplying probe light and an optical signal respectively to the first optical path and the third optical path, a converted optical signal is output from the second optical path.

An optical fiber is generally used as the nonlinear optical medium in the NOLM. In particular, a NOLM using a SOA as the nonlinear optical medium is referred to as a SLALOM (Semiconductor Laser Amplifier in a Loop Mirror).

In an optical fiber communication system that has been put to practical use in recent years, a reduction in signal power due to transmission line loss, coupling loss, etc. is compensated by using an optical amplifier such as an erbium doped fiber amplifier (EDFA). The optical amplifier is an analog amplifier, which functions to linearly amplify a signal. In this kind of optical amplifier, amplified spontaneous emission (ASE) noise generated in association with the amplification is added to cause a reduction in signal-to-noise ratio (S/N ratio), so that the number of repeaters (optical amplifiers) is limited to result in the limit of a transmission distance. Further, waveform degradation due to the chromatic dispersion owned by an optical fiber and the nonlinear optical effects in the fiber is another cause of the transmission limit. To break down such a limit, a regenerative repeater for digitally processing a signal is required, and it is desirable to realize such a regenerative repeater. In particular, an all-optical regenerative repeater capable of performing all kinds of signal processing at the optical level is important in realizing a transparent operation independent of the bit rate, pulse shape, etc. of a signal.

The functions required for the all-optical regenerative repeater are amplitude restoration or reamplification, waveform shaping or reshaping, and timing restoration or retiming. These functions are referred to as 3R functions, and in particular, the first and second functions are referred to as 2R functions.

The 2R functions can be provided by combining a waveform shaper and an optical amplifier, or by using a waveform shaper having an optical amplifying function. Further, the 3R functions can be provided by additionally using a clock regenerator in parallel to the 2R functions.

In the case of using an optical-level time division multiplexing (OTDM) type regenerative repeater for WDM (wavelength division multiplexed) signal light obtained by wavelength division multiplexing a plurality of optical signals having different wavelengths, there is a problem such that unless the modulation-phases of the plural optical signals to be input into the repeater have stable temporal order, stable regeneration processing cannot be performed.

SUMMARY OF THE INVENTION

It is therefore an object of the present invention to provide an optical signal processing device which can give stable temporal order to the modulation-phases of the plural optical signals of WDM signal light.

In accordance with an aspect of the present invention, there is provided an optical signal processing device comprising an optical demultiplexer having an input port and a plurality of output ports, said input port being adapted to accept WDM signal light obtained by wavelength division multiplexing a plurality of optical signals having different wavelengths; an optical multiplexer having an output port and a plurality of input ports; a plurality of optical paths for respectively connecting said plurality of output ports and said plurality of input ports; at least one delay adjuster provided on at least one of said plurality of optical paths; a detector for detecting the modulation-phase of at least one of said plurality of optical signals; and a controller for controlling said delay adjuster according to said modulation-phase detected by said detector.

With this configuration, the controller controls the delay adjuster according to the above-mentioned condition, thereby allowing stable temporal order to be given to the modulation-phases of the plural optical signals of the WDM signal light.

In accordance with another aspect of the present invention, there is provided an optical signal processing device comprising a phase adjusting section and an all-optical regenerating section, said phase adjusting section comprising an optical demultiplexer having an input port and a plurality of output ports, said input port being adapted to accept WDM signal light obtained by wavelength division multiplexing a plurality of optical signals having different wavelengths; an optical multiplexer having an output port and a plurality of input ports; a plurality of optical paths for respectively connecting said plurality of output ports and said plurality of input ports; at least one delay adjuster provided on at least one of said plurality of optical paths; a detector for detecting the modulation-phase of at least one of said plurality of optical signals; and a controller for controlling said delay adjuster according to said modulation-phase detected by said detector.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
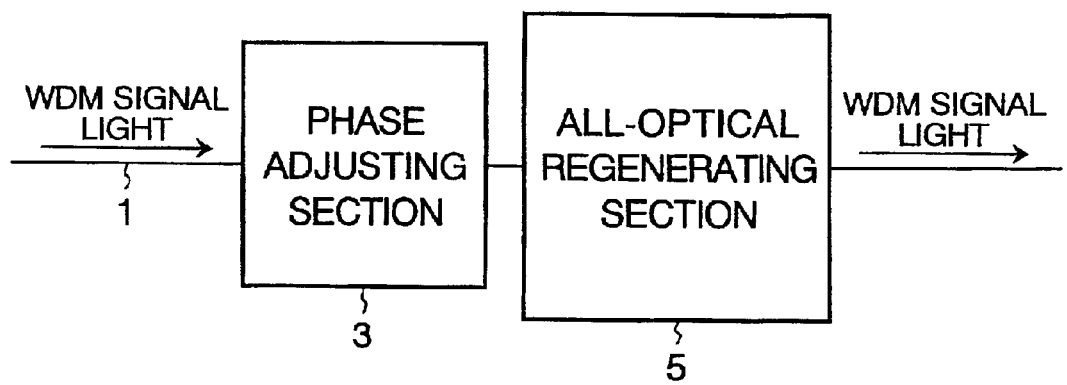
FIG. 1 is a block diagram showing a preferred embodiment of the system according to the present invention.

Some preferred embodiments of the present invention will now be described in detail with reference to the attached drawings. Throughout the drawings, the same or like parts are denoted by the same reference numerals.

Referring to FIG. 1, there is shown a preferred embodiment of the optical signal processing system according to the present invention. This system includes a modulation-phase adjusting section 3 and an all-optical regenerating section 5 arranged along an optical fiber transmission line 1 in this order in the propagation direction of WDM signal light. The modulation-phase adjusting section 3 measures the modulation-phase of an optical signal in each wavelength channel of the WDM signal light, and adjusts the modulation-phase thus measured to thereby output the WDM signal light in the condition that some temporal order is maintained. A specific configuration of the modulation-phase adjusting section 3 will be hereinafter described. As the all-optical regenerating section 5, a Mach-Zehnder interferometer type optical gate or a NOLM may be used.

Figure 2:
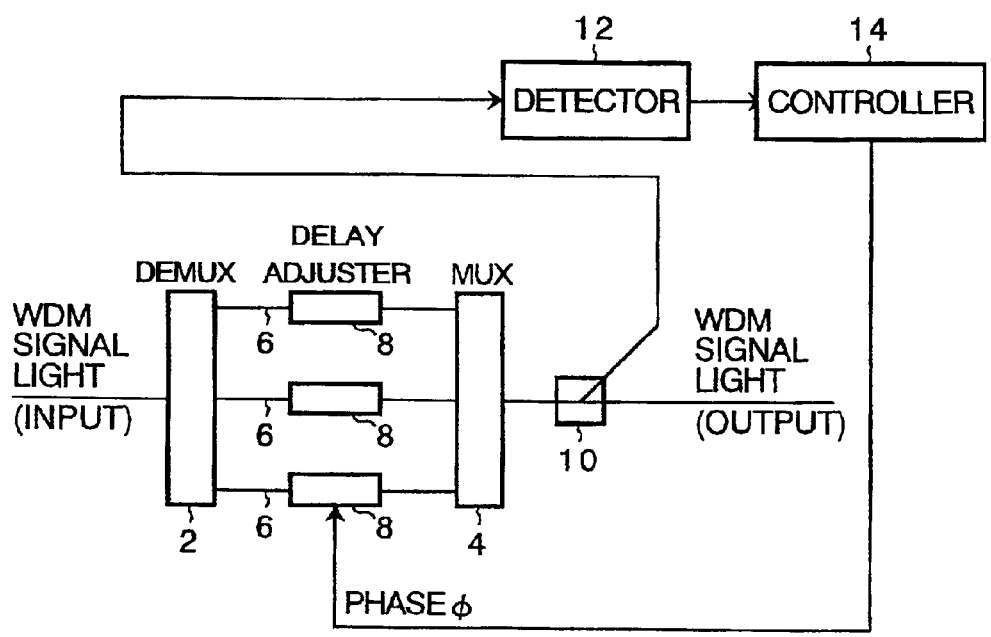
FIG. 2 is a block diagram showing a basic configuration of the optical signal processing device according to the present invention.

FIG. 2 is a block diagram showing a basic configuration of the optical signal processing device according to the present invention. The device according to the present invention may be used as the modulation-phase adjusting section 3 shown in FIG. 1, for example.

The device shown in FIG. 2 is adapted to WDM, and therefore includes an optical demultiplexer (DEMUX) 2 having an input port and a plurality of output ports and an optical multiplexer (MUX) 4 having an output port and a plurality of input ports. WDM signal light obtained by wavelength division multiplexing a plurality of optical signals having different wavelengths is supplied to the input port of the optical demultiplexer 2. In the optical demultiplexer 2, the input port and each output port are optically coupled by a specific wavelength. In the optical multiplexer 4, each input port and the output port are optically coupled by a specific wavelength.

The plural output ports of the optical demultiplexer 2 and the plural input ports of the optical multiplexer 4 are respectively connected by a plurality of optical paths 6. At least one of the plural optical paths 6 is provided with a delay adjuster 8. In this preferred embodiment, all of the plural optical paths 6 are respectively provided with a plurality of delay adjusters 8.

The input WDM signal light is separated into a plurality of optical signals by the optical demultiplexer 2. The plural optical signals output from the optical demultiplexer 2 are respectively subjected to delay by the plural delay adjusters 8, and then wavelength division multiplexed by the optical multiplexer 4 to obtain WDM signal light again. A part of the WDM signal light output from the optical multiplexer 4 is extracted as monitor light by an optical coupler 10, and the remaining WDM signal light is then output from this device.

The monitor light is supplied to a detector 12. The detector 12 detects the modulation-phase of at least one of the plural optical signals of the WDM signal light. An output from the detector 12 is supplied to a controller 14. The controller 14 controls the delay adjuster 8 of the corresponding wavelength channel.

Figure 3:
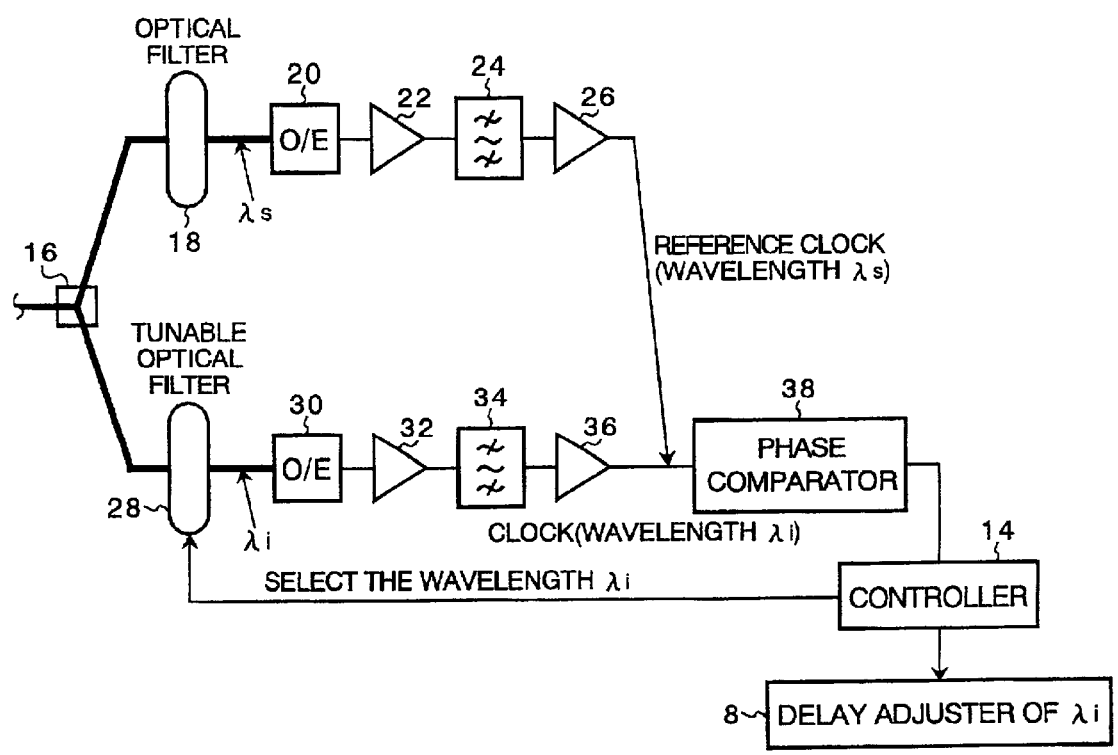
FIG. 3 is a block diagram of an essential part showing a first preferred embodiment of the optical signal processing device according to the present invention.

FIG. 3 is a block diagram of an essential part showing a first preferred embodiment of the optical signal processing device according to the present invention. The monitor light from the optical coupler 10 (see FIG. 2) is branched into two components by an optical coupler 16. One of the two components is supplied to an optical filter 18, and the other component is supplied to a tunable optical filter 28. The optical filter 18 passes an optical signal having a reference wavelength $\lambda_s$. The optical signal passed through the optical filter 18 is converted into an electrical signal by an opto/electrical converter (O/E) 20. The electrical signal output from the opto/electrical converter 20 is amplified by an amplifier 22, and then supplied to a bandpass filter 24 to thereby extract a reference clock component. The reference clock component thus regenerated is amplified by an amplifier 26, and then supplied to a phase comparator 38.

On the other hand, the tunable optical filter 28 passes an optical signal having an arbitrary wavelength $\lambda_i$. The optical signal passed through the tunable optical filter 28 is converted into an electrical signal by an opto/electrical converter 30. The electrical signal output from the opto/electrical converter 30 is amplified by an amplifier 32, and then supplied to a bandpass filter 34 to thereby extract a clock component. The clock component is amplified by an amplifier 36, and then supplied to the phase comparator 38. The phase comparator 38 compares the phases of the reference clock component and the clock component supplied thereto, and the result of this comparison is applied to the controller 14. The controller 14 controls the delay by the delay adjuster 8 corresponding to the wavelength $\lambda_i$ so that the phases of the reference clock component and the clock component coincide with each other. The wavelength $\lambda_i$ of the optical signal to be passed through the tunable optical filter 28 is selected by a signal from the controller 14.

To perform such phase synchronization between the reference clock component and the clock component as in the preferred embodiment shown in FIG. 3, a phase-locked loop may be used.

Figure 4:
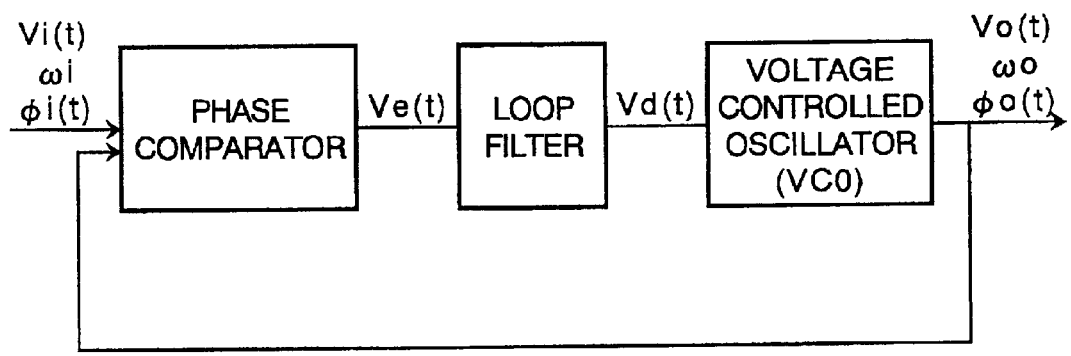
FIG. 4 is a block diagram showing the configuration of a phase-locked loop.

FIG. 4 is a block diagram showing the configuration of a general phase-locked loop. There will now be described simultaneous reducing of a frequency difference and a phase difference in the phase-locked loop.

An input signal Vi(t) and an output Vo(t) from a VCO (voltage controlled oscillator) are given as follows:

$$Vi(t)=\sin[\omega it+\phi i(t)]$$

$$Vo(t)=\cos[\omega ot+\phi o(t)]$$

Accordingly, an output Ve(t) from a phase comparator using a multiplying circuit is expressed as follows:

$$Ve(t) = Ke\sin[\omega i t + \phi i(t)] \times \cos[\omega o t + \phi o(t)]$$
$$= (1/2)Ke\{\sin[(\omega i - \omega o)t + \phi i(t) - \phi o(t)] +$$
$$\sin[(\omega i + \omega o)t + \phi i(t) + \phi 0(t)]\}$$

The second term is considered to attenuate because of the frequency limit in the circuit, so that only the differential frequency component remains to give the following expression.

$$Ve(t)=(1/2)Ke\sin[(\omega i-\omega o)t+\phi i(t)-\phi o(t)]$$

The difference in angular frequency ω is considered to be included in the phase term ø, thus giving the following expression.

$$Ve(t)=(1/2)Ke\sin[\phi i(t)-\phi o(t)]$$

Letting f(t) denote the impulse response function of a loop filter, an output Vd(t) from the loop filter is given as follows:

$$Vd(t) = \int_0^\infty Ve(\tau)f(t-\tau)d\tau$$

When t−τ<0, f(t)=0 from the causality. Accordingly, Vd(t) can be transformed as follows:

$$Vd(t) = \int_0^\infty Ve(t-\tau)f(t)d\tau$$

Further, letting øo denote the output from the VCO, the following expression is given.

$$d\phi o(t)/dt=Ko\ Vd(t)$$

Accordingly, $$d\phi o(t)/dt = KoKe\int_0^\infty Ve(t-\tau)f(t)d\tau$$
$$= K\int_0^\infty \{\sin[\phi i(t-\tau)] - \sin[\phi o(t-\tau)]\}f(t)d\tau$$
$$\approx K\int_0^\infty \{[\phi i(t-\tau)] - [\phi o(t-\tau)]\}f(t)d\tau$$

where K=(½)KoKe and sin θ≈θ. Laplace transform is applied to this expression to give the following expression.

$$\Phi o(S)=K[\Phi i(S)-\Phi o(S)]F(S)/S$$

Accordingly, Eq. (1) is given as follows:

$$\Phi o(S) = \frac{KF(S)/S}{1+KF(S)/S}\Phi i(S) \qquad (1)$$

Assuming that H(S)=Φo(S)/Φi(S)=KF(S)/[S+KF(S)], a phase error function E(S) is given as follows:

$$E(S) = 1 - H(S)$$
$$= [\Phi i(S) - \Phi o(S)]/\Phi i(S)$$
$$= \Phi e(S)/\Phi i(S)$$

In the case that a frequency difference of Δf is present between the frequency of the input signal and the natural oscillation frequency of the VCO, a steady-state phase error Φes is expressed below by using the final-value theorem of Laplace transform (which can be derived from the differential formula of Laplace transform), i.e.:

$$\Phi es = \lim_{t\to\infty}\phi e(t) = \lim_{S\to 0}[S\Phi e(S)]$$

and $\Phi i(t)=2\pi\Delta ft+\theta o$ under the condition of t=0, i.e., $\Phi i(S)=2\pi\Delta f/S^2 +\theta o/S$.

$$\Phi es=\lim \Phi e(t)=\lim [S(S/(S+KF(S))(2\pi\Delta f/S^1+\theta o/S))] \qquad (2)$$

That is, the initial phase error (inclusive of the frequency difference) is reduced to 1/[KF(0)] by the phase-locked loop.

Figure 5:
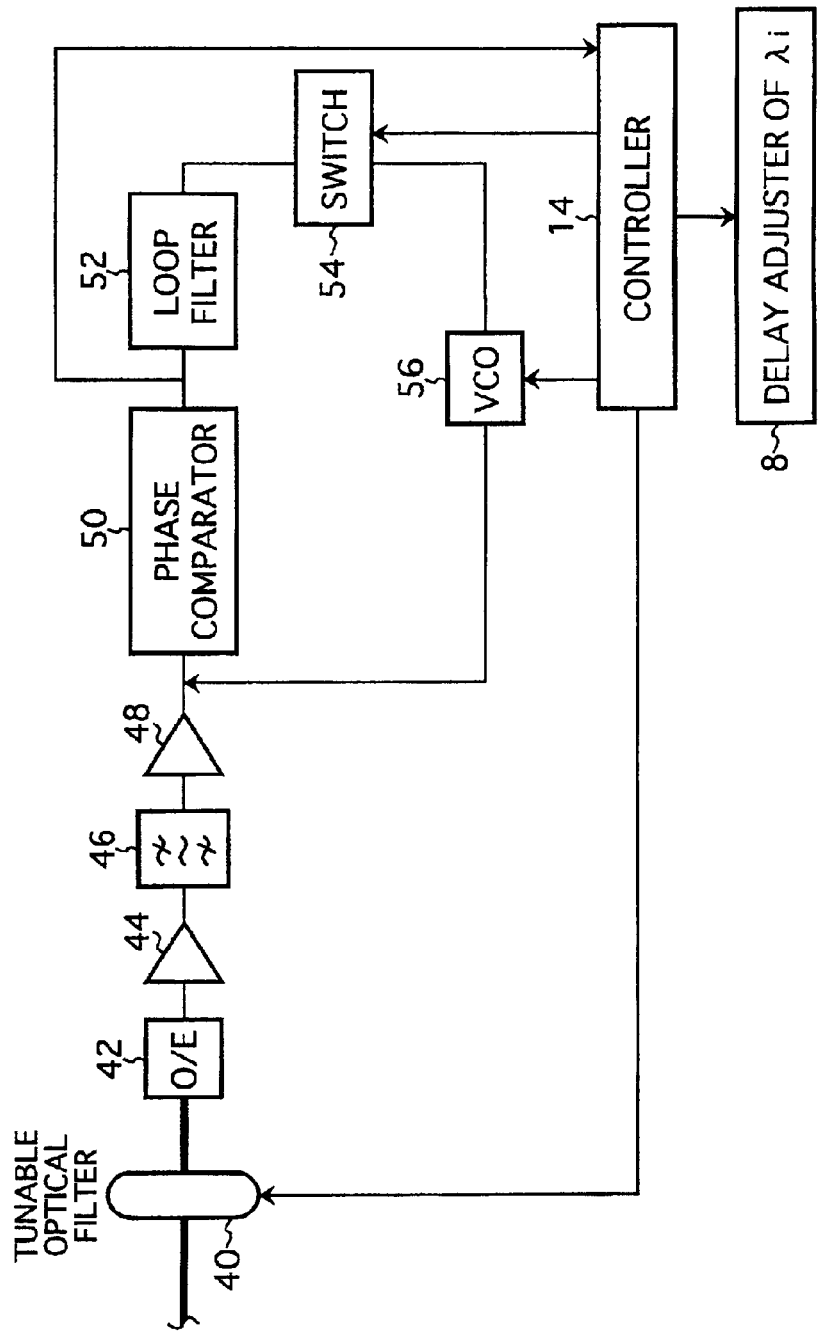
FIG. 5 is a block diagram of an essential part showing a second preferred embodiment of the optical signal processing device according to the present invention.

FIG. 5 is a block diagram of an essential part showing a second preferred embodiment of the optical signal processing device according to the present invention. In this preferred embodiment, the detector 12 (see FIG. 2) includes a tunable optical filter 40 for passing an optical signal having an arbitrary wavelength, a circuit for regenerating first and second clocks respectively according to an optical signal having a first wavelength (reference wavelength) $\lambda_s$ passed through the tunable optical filter 40 and an optical signal having a second wavelength $\lambda_i$ passed through the tunable optical filter 40, and a phase comparator 50 for comparing the phases of the first and second clocks. The circuit for regenerating the first and second clocks includes an opto/electrical converter 42 for converting an optical signal passed through the tunable optical filter 40 into an electrical signal, an amplifier 44 for amplifying an output from the converter 42, a bandpass filter 46 for accepting an output from the amplifier 44, and an amplifier 48 for amplifying an output from the bandpass filter 46.

A phase-locked loop is configured by the phase comparator 50, a loop filter 52, a switch 54, and a VCO 56. The switch 54, the VCO 56, and the tunable optical filter 40 are controlled by the controller 14.

The flow of operation of the device shown in FIG. 5 will now be described.

The controller 14 tunes the tunable optical filter 40 so that the tunable optical filter 40 passes only the optical signal having the wavelength $\lambda_s$. Then, the switch 54 is turned on by the controller 14 to make the phase-locked loop function. That is, when the switch 54 is in the on-state, the oscillating condition of the VCO 56 changes according to an output from the loop filter 52. At this time, a reference clock synchronized with a clock obtained from the optical signal having the wavelength $\lambda_s$ is obtained according to the operation of the phase-locked loop. The VCO 56 has a function of storing the output from the loop filter 52, so that the frequency and phase of the reference clock can be locked.

Then, the switch 54 is turned off by the controller 14.

Thereafter, the controller 14 tunes the tunable optical filter 40 so that the tunable optical filter 40 passes only the optical signal having the wavelength $\lambda_i$. The phase comparator 50 then measures a phase difference between a clock obtained from the optical signal having the wavelength $\lambda_i$ and the reference clock synchronous with the clock of the optical signal having the wavelength $\lambda_s$, and supplies the measured phase difference to the controller 14. Finally, the controller 14 controls the delay adjuster 8 corresponding to the wavelength $\lambda_i$ so that the measured phase difference becomes a desired value, e.g., zero.

Figure 6:
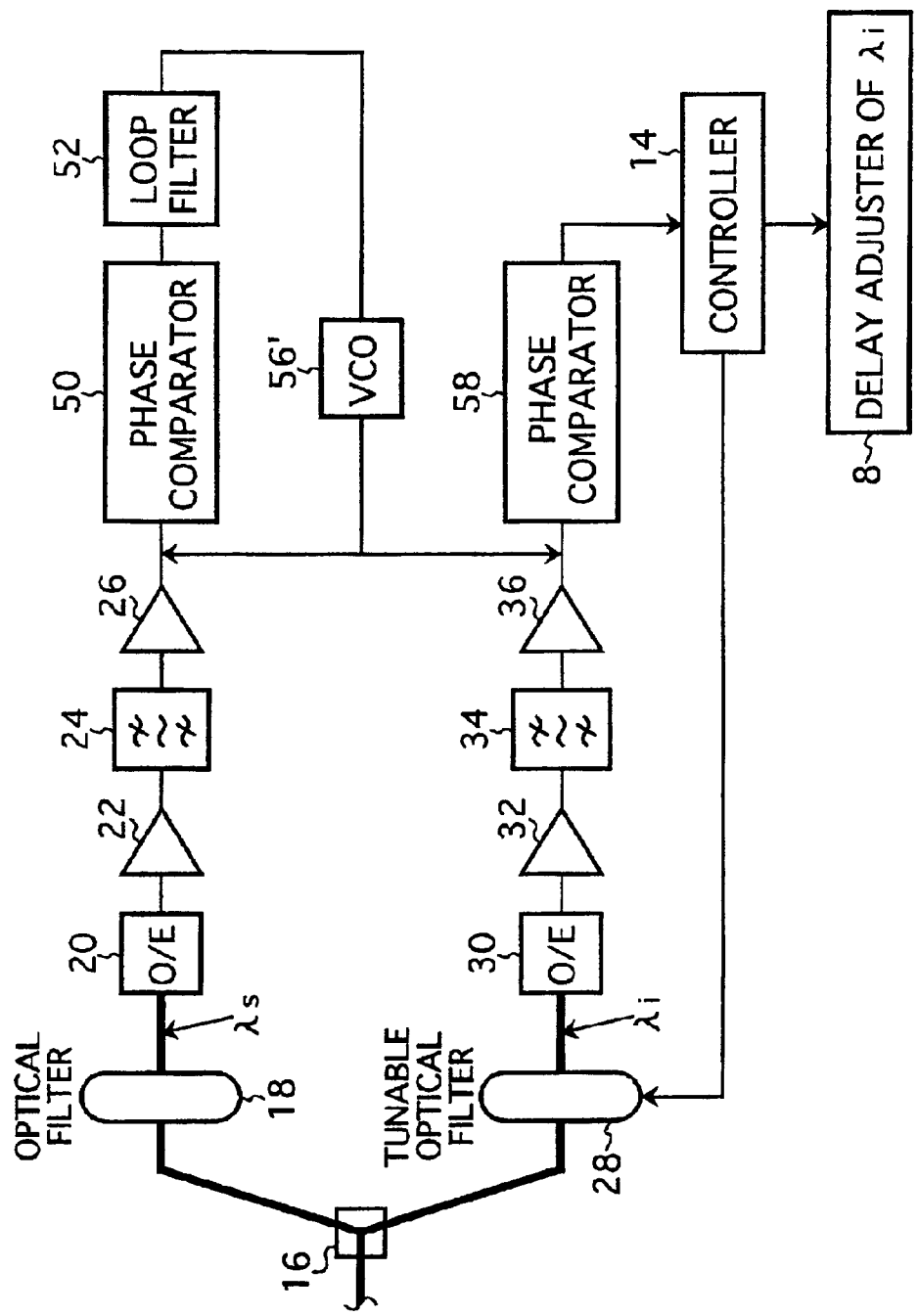
FIG. 6 is a block diagram of an essential part showing a third preferred embodiment of the optical signal processing device according to the present invention.

FIG. 6 is a block diagram of an essential part showing a third preferred embodiment of the optical signal processing device according to the present invention. Like the preferred embodiment shown in FIG. 3, the third preferred embodiment employs an optical filter 18, a tunable optical filter 28, opto/electrical converters 20 and 30, amplifiers 22, 26, 32, and 36, and bandpass filters 24 and 34. Further, in relation to a clock obtained from an optical signal having a wavelength $\lambda_s$, a phase-locked loop similar to that shown in FIG. 5 is configured. This phase-locked loop is composed of a phase comparator 50, a loop filter 52, and a VCO 56'. The VCO 56' does not have a function of storing an output from the loop filter 52. In association therewith, the switch 54 (see FIG. 5) is eliminated in this preferred embodiment.

In this preferred embodiment, a reference clock synchronized with the clock of the optical signal having the wavelength $\lambda_s$ is always kept oscillated by using the phase-locked loop, and this reference clock and a clock obtained from an optical signal having a wavelength $\lambda_i$ are input into a phase comparator 58 to measure a phase difference. Then, the controller 14 controls the delay adjuster 8 corresponding to the wavelength $\lambda_i$ so that the measured phase difference is minimized.

In this preferred embodiment, the reference clock is generated according to the optical signal passed through the optical filter 18. To this end, the phase-locked loop including the phase comparator 50, the loop filter 52, and the VCO 56' is used.

Figure 7:
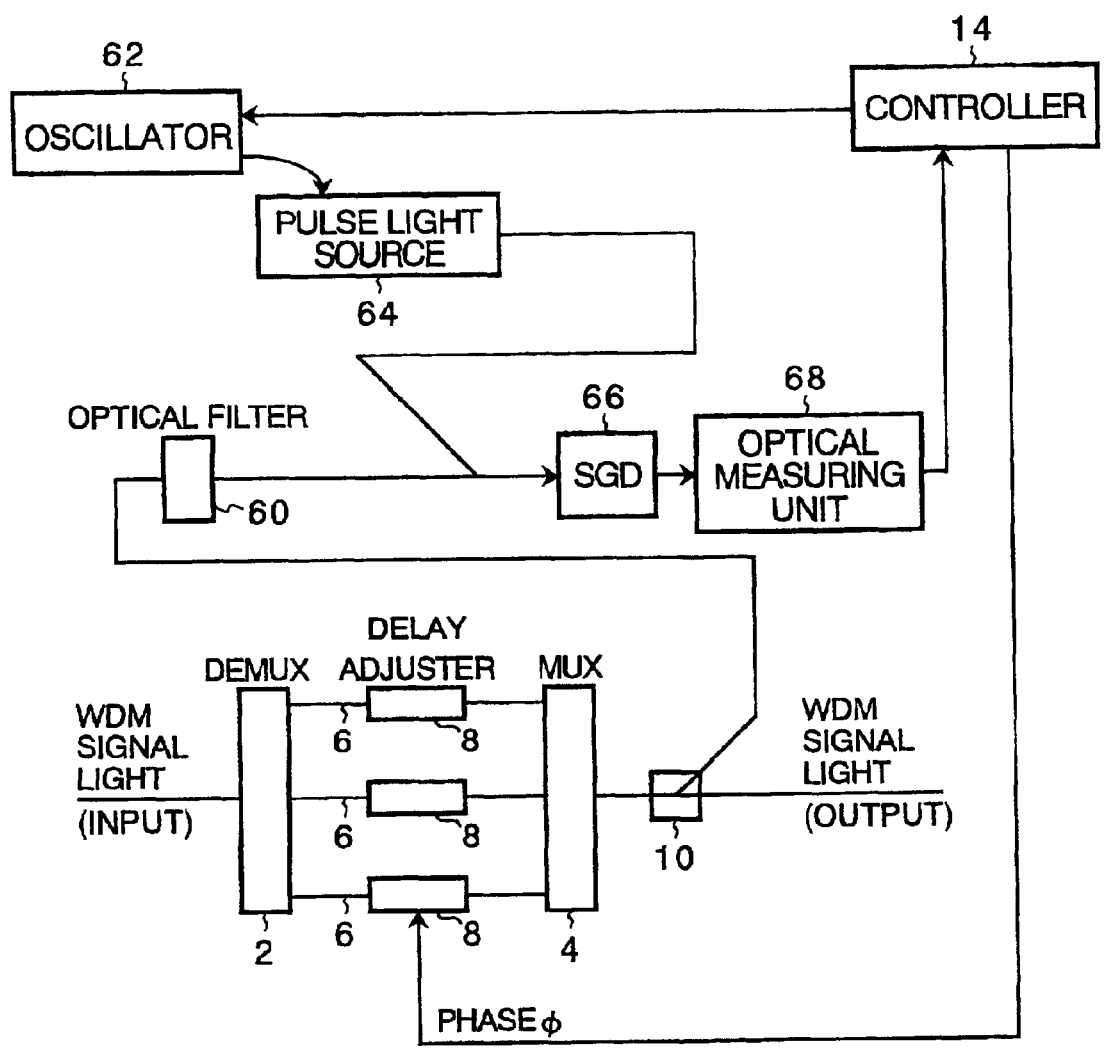
FIG. 7 is a block diagram showing a fourth preferred embodiment of the optical signal processing device according to the present invention.

FIG. 7 is a block diagram showing a fourth preferred embodiment of the optical signal processing device according to the present invention. The WDM signal light as monitor light extracted by the optical coupler 10 is supplied to an optical filter 60 for passing an optical signal having an arbitrary wavelength. A pulse light source 64 to be driven by an oscillator 62 is used to generate reference pulse light. The optical signal passed through the optical filter 60 and the reference pulse light generated from the pulse light source 64 are supplied to a gain saturation device (SGD) 66. An output from the gain saturation device 66 is supplied to an optical measuring unit 68. The optical measuring unit 68 detects the average power of light output from the gain saturation device 66. In this case, the controller 14 controls the corresponding delay adjuster 8 so that the average power detected by the optical measuring unit 68 is reduced.

Figure 8A:
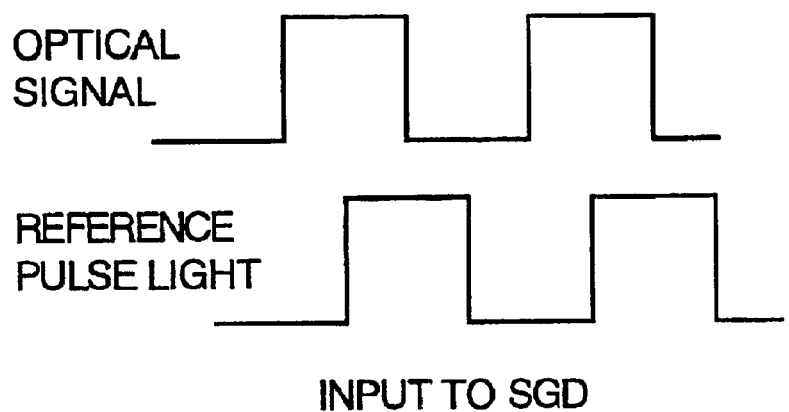
FIGS. 8A and 8B are charts showing the waveforms of inputs and an output with respect to a gain saturation device 66 shown in FIG. 7, respectively.
Figure 8B:
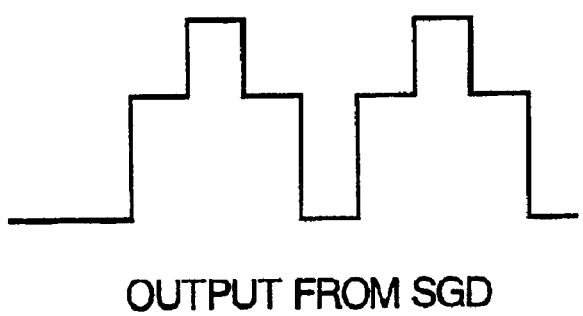

Referring to FIGS. 8A and 8B, there are shown the waveforms of the inputs and the output with respect to the gain saturation device 66. The reference pulse light output from the pulse light source 64 has a clock frequency 1/N (N is a natural number) times the clock frequency of each optical signal. Further, the pulse width of the reference pulse light is substantially equal to the pulse width of the optical signal. In FIG. 8A, the waveform of the reference pulse light is that in the case of N=1.

In the case that the optical signal and the reference pulse light are shifted in timing from each other as shown in FIG. 8A, the power of an overlapping portion between the optical signal and the reference pulse light is smaller than the sum of the powers of the optical signal and the reference pulse light as shown in FIG. 8B, because of the result of gain saturation in the gain saturation device 66. More specifically, in the case that the modulation-phases of the optical signal and the reference pulse light coincide with each other, the average power of light output from the gain saturation device 66 becomes minimum. Accordingly, by operating the controller 14 to control the delay adjuster 8 so that the average power detected by the optical measuring unit 68 shown in FIG. 7 becomes minimum, the modulation-phase of each optical signal can be made to coincide with the modulation-phase of the reference pulse light.

In the case that the oscillation frequency 1/N times the clock frequency of the optical signal is not obtained in the oscillator 62 and the pulse light source 64, the controller 14 can finely adjust the oscillation frequency in the oscillator 62. That is, by finely adjusting the oscillation frequency so that the temporal period of fluctuations in the average power of output light from the gain saturation device 66 is increased, the reference pulse light having a clock frequency 1/N times the clock frequency of the optical signal can be obtained.

Figure 9:
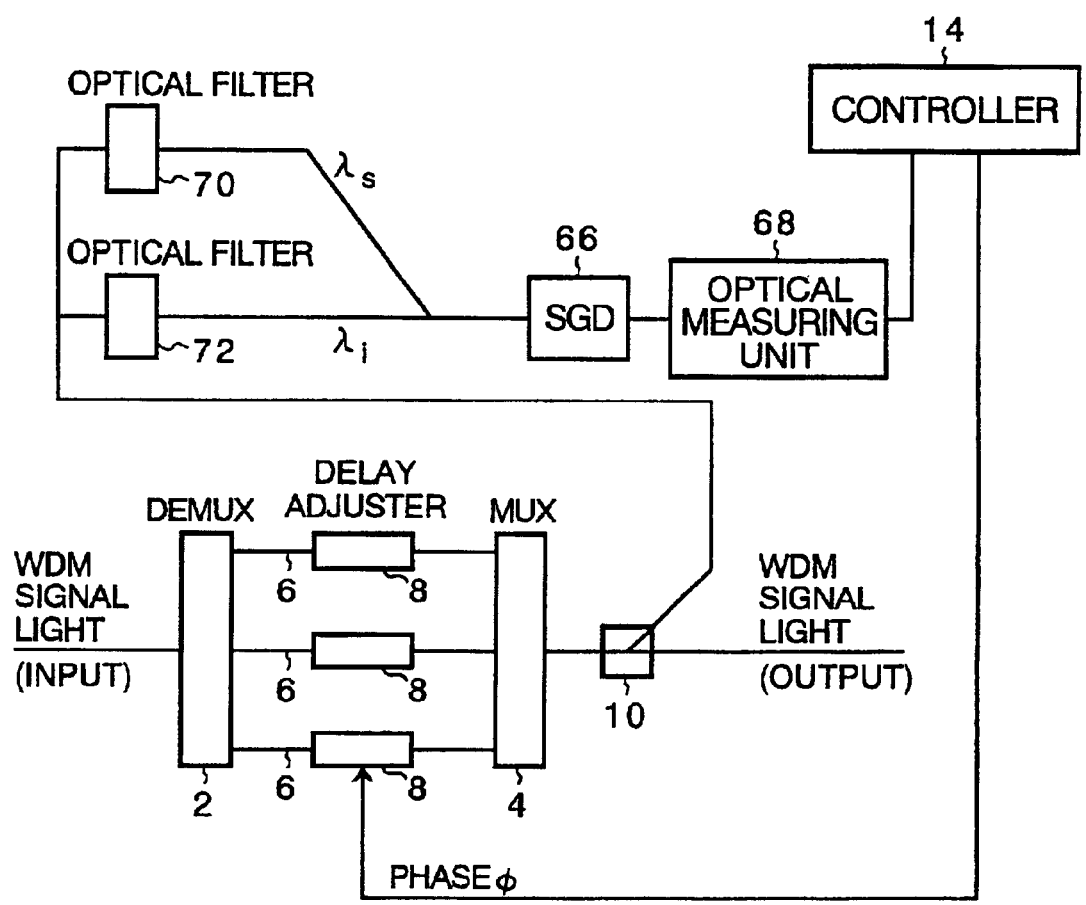
FIG. 9 is a block diagram showing a fifth preferred embodiment of the optical signal processing device according to the present invention.

FIG. 9 is a block diagram showing a fifth preferred embodiment of the optical signal processing device according to the present invention. In this preferred embodiment, an optical filter 70 for passing an optical signal having a reference wavelength $\lambda_s$ and an optical filter 72 for passing an optical signal having an arbitrary wavelength $\lambda_i$ are arranged in parallel, and the optical signals passed through the optical filters 70 and 72 are input into a gain saturation device 66. An optical measuring unit 68 and a controller 14 are provided so as to function similarly to those in the preferred embodiment shown in FIG. 7.

With this configuration, the oscillator 62 and the pulse light source 64 shown in FIG. 7 are eliminated, but the phase of the optical signal having the wavelength $\lambda_i$ can be made to coincide with the modulation-phase of the optical signal having the wavelength $\lambda_s$ substantially in accordance with the principle in the preferred embodiment shown in FIG. 7. The operation may be performed without the optical filters 70 and 72.

Figure 10:
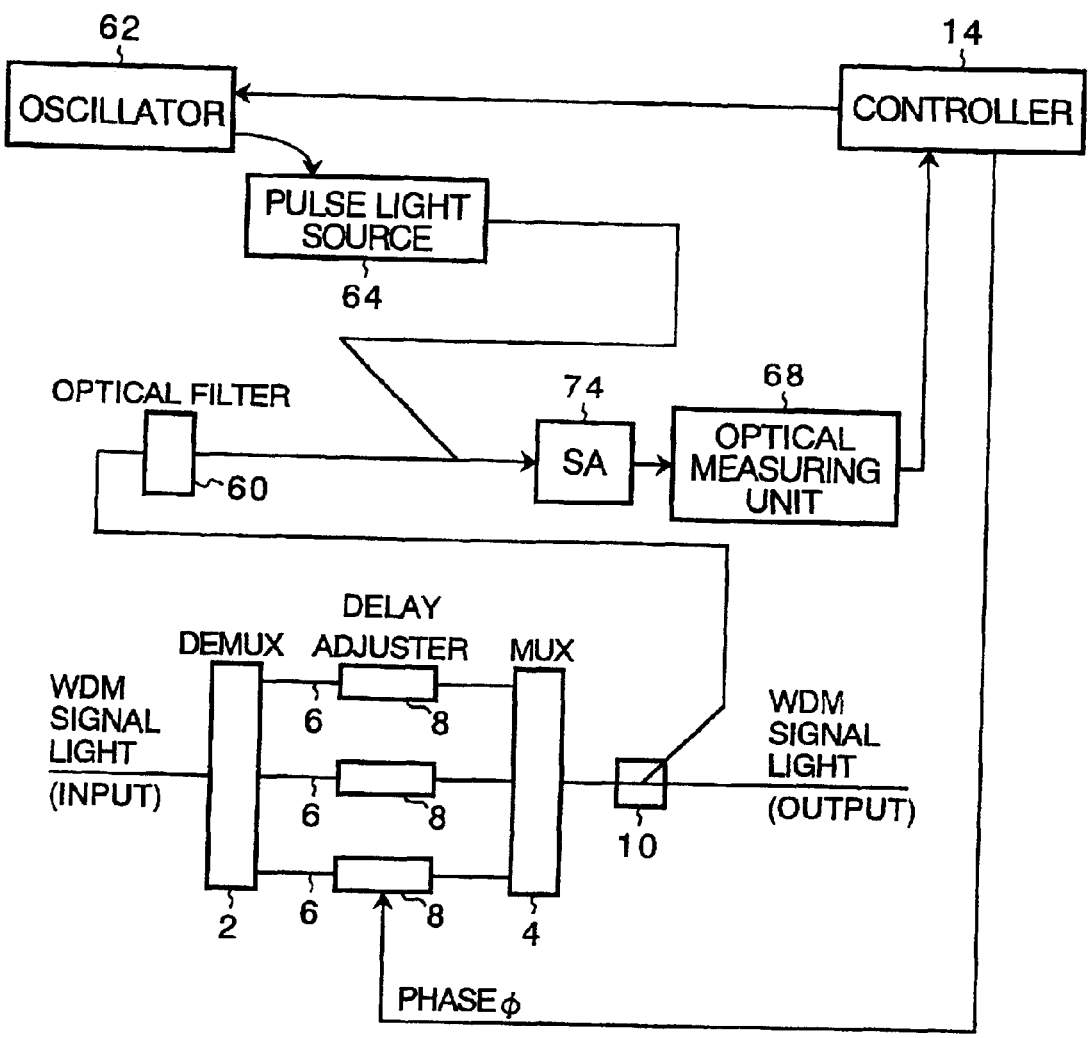
FIG. 10 is a block diagram showing a sixth preferred embodiment of the optical signal processing device according to the present invention.

FIG. 10 is a block diagram showing a sixth preferred embodiment of the optical signal processing device according to the present invention. The WDM signal light as monitor light extracted by the optical coupler 10 is supplied to an optical filter 60 for passing an optical signal having an arbitrary wavelength. A pulse light source 64 to be driven by an oscillator 62 is used to generate reference pulse light. The optical signal passed through the optical filter 60 and the reference pulse light generated from the pulse light source 64 are supplied to a saturable absorption device (SA) 74. An output from the saturable absorption device 74 is supplied to an optical measuring unit 68. The optical measuring unit 68 detects the average power of light output from the saturable absorption device 74. In this case, the controller 14 controls the corresponding delay adjuster 8 so that the average power detected by the optical measuring unit 68 is increased.

Figure 11A:
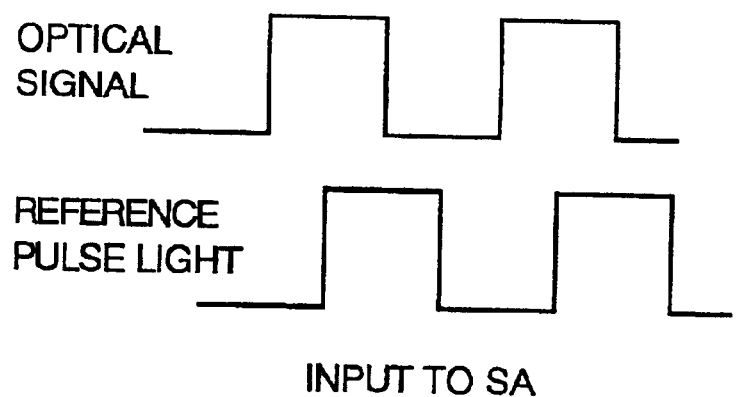
FIGS. 11A and 11B are charts showing the waveforms of inputs and an output with respect to a saturable absorption device 74 shown in FIG. 10, respectively.
Figure 11B:
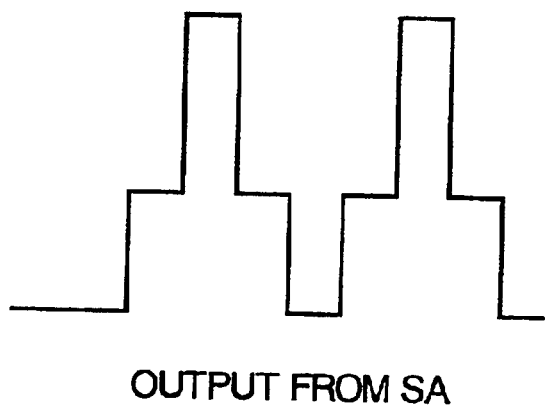

Referring to FIGS. 11A and 11B, there are shown the waveforms of the inputs and the output with respect to the saturable absorption device 74. The reference pulse light output from the pulse light source 64 has a clock frequency 1/N (N is a natural number) times the clock frequency of each optical signal. Further, the pulse width of the reference pulse light is substantially equal to the pulse width of the optical signal. In FIG. 11A, the waveform of the reference pulse light is that in the case of N=1.

In the case that the optical signal and the reference pulse light are shifted in timing from each other as shown in FIG. 11A, the power of an overlapping portion between the optical signal and the reference pulse light is larger than the sum of the powers of the optical signal and the reference pulse light as shown in FIG. 11B, because of the result of saturable absorption in the saturable absorption device 74. More specifically, in the case that the modulation-phases of the optical signal and the reference pulse light coincide with each other, the average power of light output from the saturable absorption device 74 becomes maximum. Accordingly, by operating the controller 14 to control the delay adjuster 8 so that the average power detected by the optical measuring unit 68 shown in FIG. 10 becomes maximum, the modulation-phase of each optical signal can be made to coincide with the modulation-phase of the reference pulse light.

In the case that the oscillation frequency 1/N times the clock frequency of the optical signal is not obtained in the oscillator 62 and the pulse light source 64, the controller 14 can finely adjust the oscillation frequency in the oscillator 62. That is, by finely adjusting the oscillation frequency so that the temporal period of fluctuations in the average power of output light from the saturable absorption device 74 is increased, the reference pulse light having a clock frequency 1/N times the clock frequency of the optical signal can be obtained.

Figure 12:
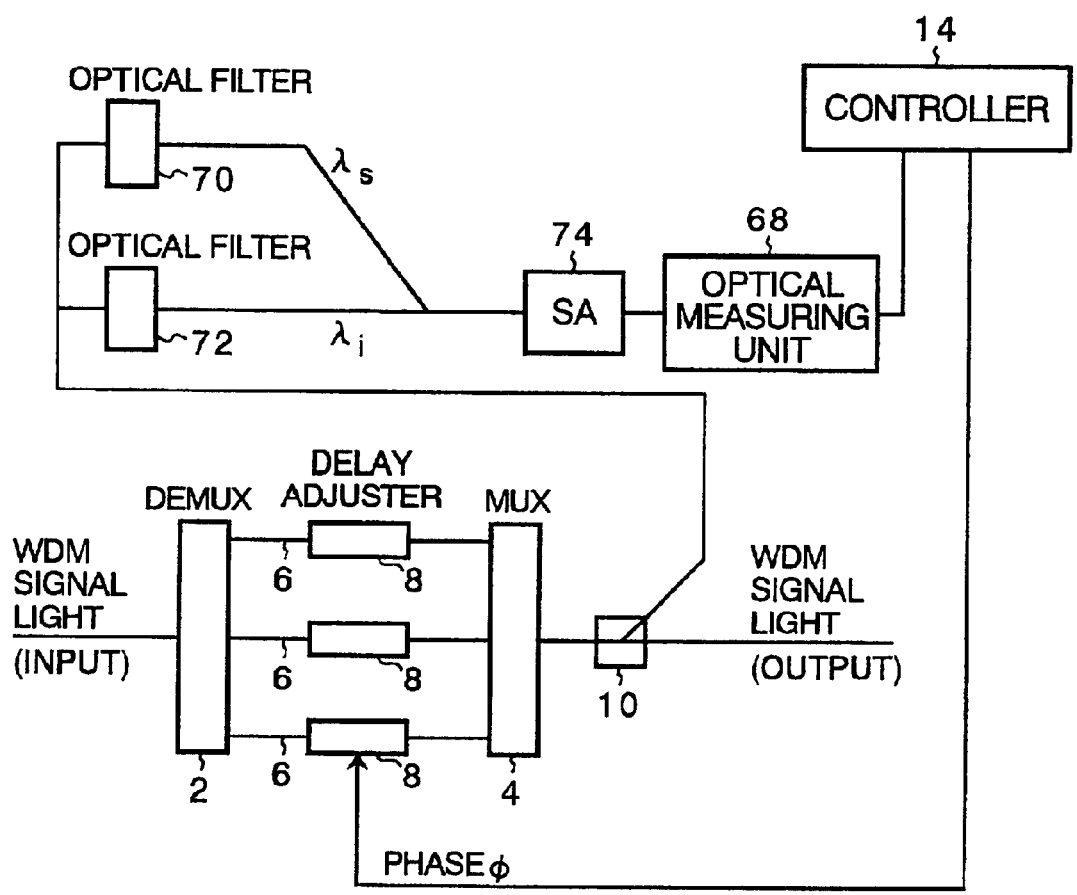
FIG. 12 is a block diagram showing a seventh preferred embodiment of the optical signal processing device according to the present invention.

FIG. 12 is a block diagram showing a seventh preferred embodiment of the optical signal processing device according to the present invention. In this preferred embodiment, an optical filter 70 for passing an optical signal having a reference wavelength $\lambda_s$ and an optical filter 72 for passing an optical signal having an arbitrary wavelength $\lambda_i$ are arranged in parallel, and the optical signals passed through the optical filters 70 and 72 are input into a saturable absorption device 74. An optical measuring unit 68 and a controller 14 are provided so as to function similarly to those in the preferred embodiment shown in FIG. 10.

With this configuration, the oscillator 62 and the pulse light source 64 shown in FIG. 10 are eliminated, but the phase of the optical signal having the wavelength $\lambda_i$ can be made to coincide with the modulation-phase of the optical signal having the wavelength $\lambda_s$ substantially in accordance with the principle in the preferred embodiment shown in FIG. 10. The operation may be performed without the optical filters 70 and 72.

Figure 13:
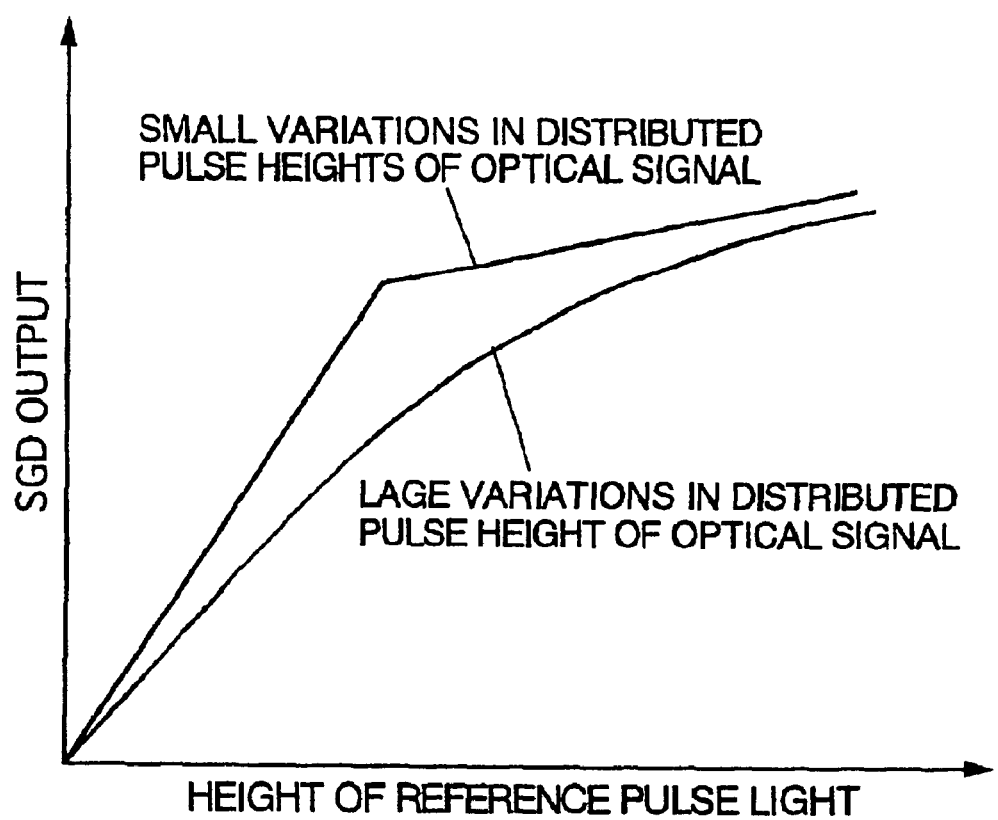
FIG. 13 is a graph showing the relation between the output from the gain saturation device 66 shown in FIG. 7 and the height of reference pulse light.

Considering that the height (amplitude) of the reference pulse light to be output from the pulse light source 64 is changed to measure the average power from the gain saturation device 66 in the preferred embodiment shown in FIG. 7, the result of measurement shown in FIG. 13 is obtained. In the case that the distribution of pulse heights of the optical signal is narrow, the variations in pulse light exhibiting gain saturation are small. Accordingly, the relation between the output from the gain saturation device 66 and the height of the reference pulse light is given as such a form that the slope of a straight line changes at some point as shown in FIG. 13. On the other hand, in the case that the distribution of pulse heights of the optical signal is wide, the variations in pulse height exhibiting gain saturation are large. Accordingly, the relation between the output from the gain saturation device 66 and the height of the reference pulse light is given as a relatively gentle curve as shown in FIG. 13. Thus, the distribution of pulse heights of the optical signal can be detected according to the relation between the output from the gain saturation device 66 and the height of the reference pulse light.

Figure 14:
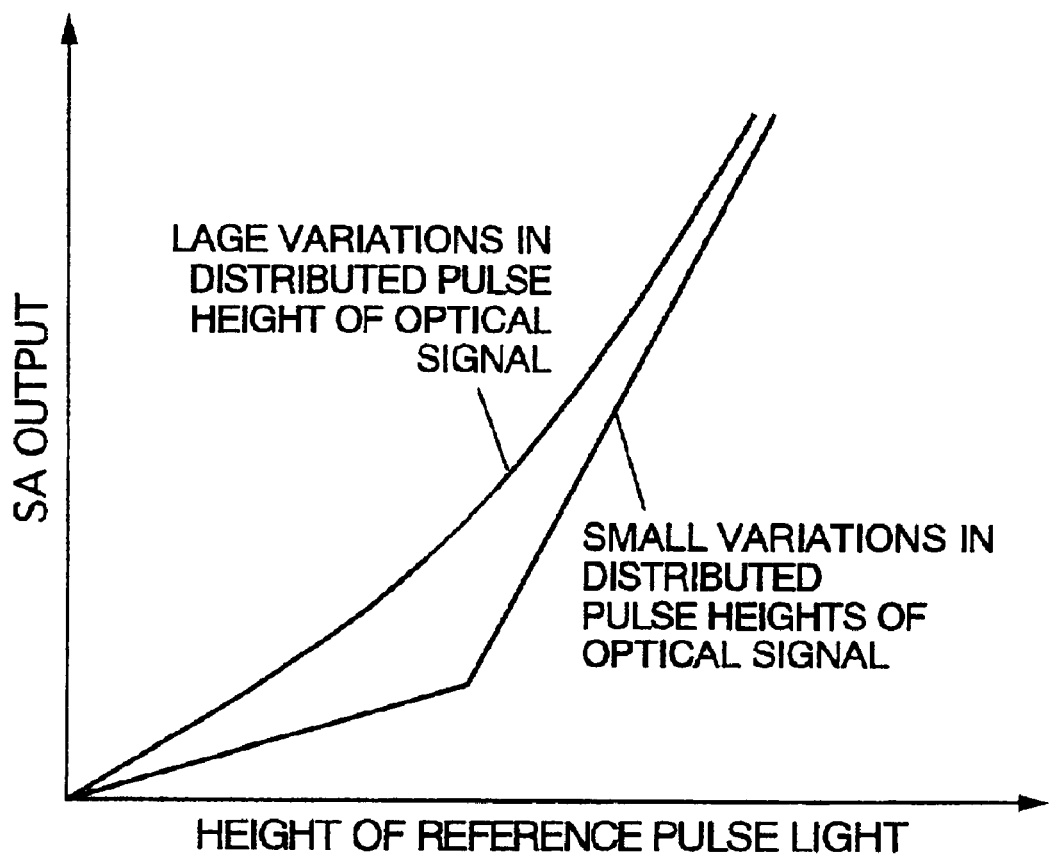
FIG. 14 is a graph showing the relation between the output from the saturable absorption device 74 shown in FIG. 10 and the height of reference pulse light.

Considering that the height (amplitude) of the reference pulse light to be output from the pulse light source 64 is changed to measure the average power from the saturable absorption device 74 in the preferred embodiment shown in FIG. 10, the result of measurement shown in FIG. 14 is obtained. In the case that the distribution of pulse heights of the optical signal is narrow, the variations in pulse light exhibiting saturable absorption are small. Accordingly, the relation between the output from the saturable absorption device 74 and the height of the reference pulse light is given as such a form that the slope of a straight line changes at some point as shown in FIG. 14. On the other hand, in the case that the distribution of pulse heights of the optical signal is wide, the variations in pulse height exhibiting saturable absorption are large. Accordingly, the relation between the output from the saturable absorption device 74 and the height of the reference pulse light is given as a relatively gentle curve as shown in FIG. 14. Thus, the distribution of pulse heights of the optical signal can be detected according to the relation between the output from the saturable absorption device 74 and the height of the reference pulse light.

Figure 15:
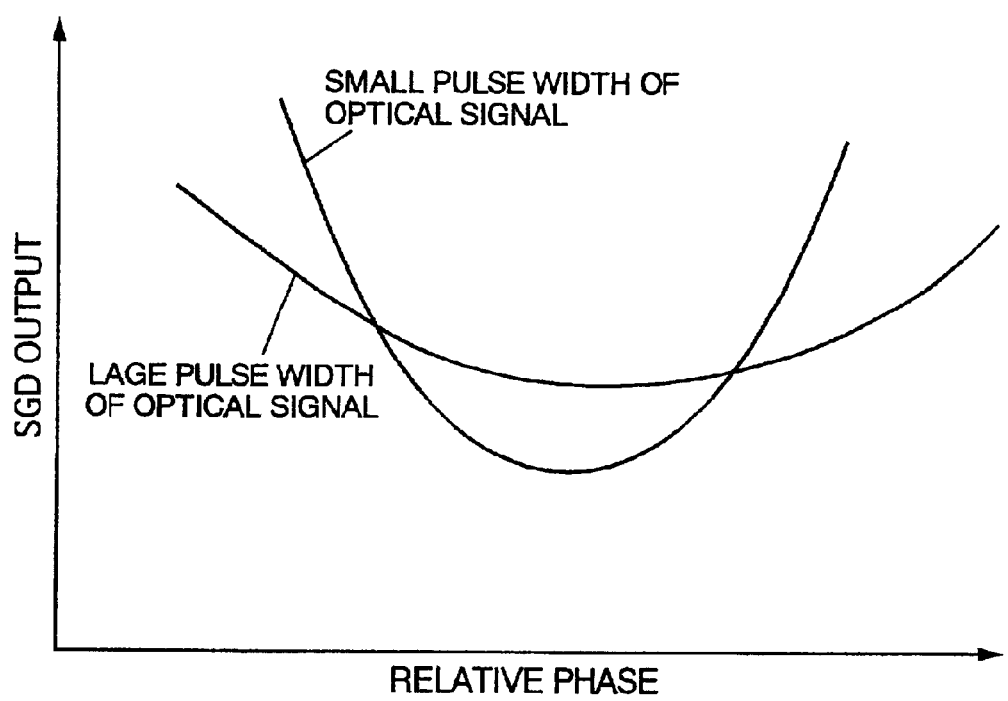
FIG. 15 is a graph showing the relation between the output from the gain saturation device 66 shown in FIG. 7 and a relative phase.

Consider the case where the pulse width of the optical signal to be input into the gain saturation device 66 changes in the preferred embodiment shown in FIG. 7. FIG. 15 shows the relation between the output from the gain saturation device 66 and a relative phase (modulation-phase difference between the reference pulse light and the optical signal). The smaller the pulse width of the optical signal, the larger the proportion of the pulse power acting as a gain saturation effect, so that the larger the change in output from the gain saturation device 66 with a change in relative phase. Accordingly, by obtaining the relation between the output from the gain saturation device 66 and the relative phase, information on the pulse width of the optical signal can be obtained.

Figure 16:
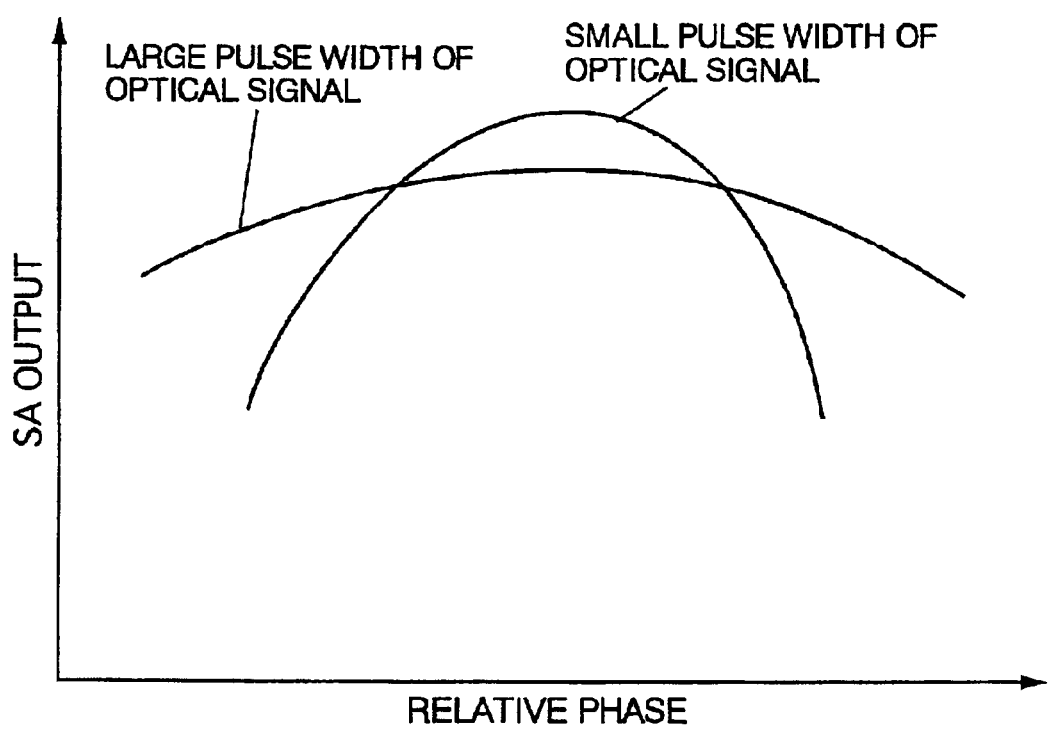
FIG. 16 is a graph showing the relation between the output from the saturable absorption device 74 shown in FIG. 10 and a relative phase.

Consider the case where the pulse width of the optical signal to be input into the saturable absorption device 74 changes in the preferred embodiment shown in FIG. 10. FIG. 16 shows the relation between the output from the saturable absorption device 74 and a relative phase (modulation-phase difference between the reference pulse light and the optical signal). The smaller the pulse width of the optical signal, the larger the proportion of the pulse power acting as a saturable absorption effect, so that the larger the change in output from the saturable absorption device 74 with a change in relative phase. Accordingly, by obtaining the relation between the output from the saturable absorption device 74 and the relative phase, information on the pulse width of the optical signal can be obtained.

Figure 17:
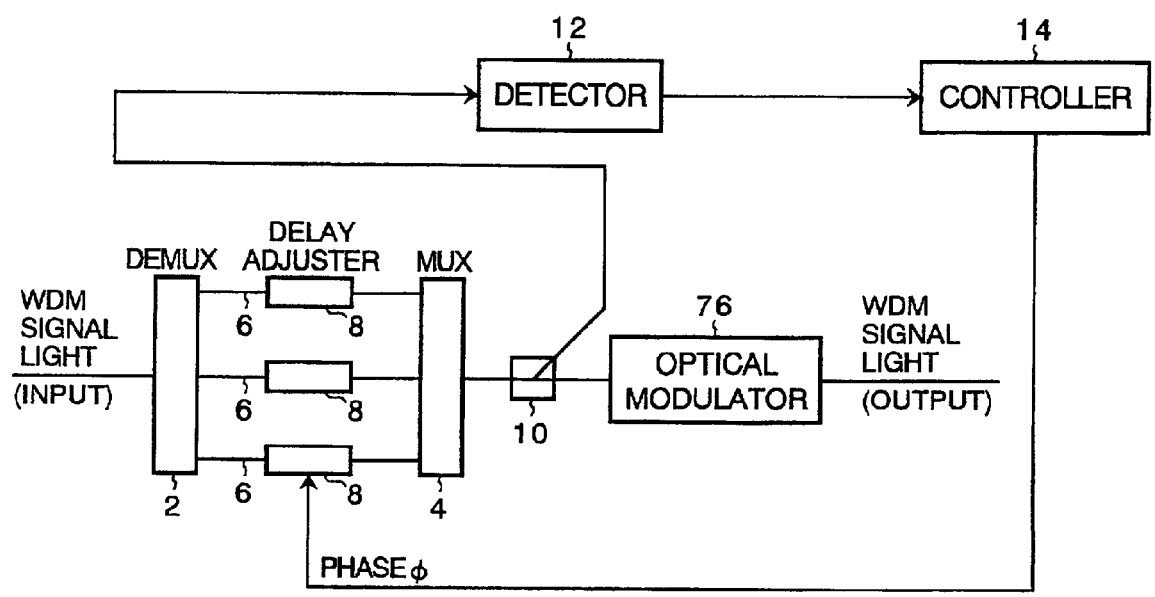
FIG. 17 is a block diagram showing another basic configuration of the optical signal processing device according to the present invention.

FIG. 17 is a block diagram showing another basic configuration of the optical signal processing device according to the present invention. In contrast to the basic configuration shown in FIG. 2, the basic configuration shown in FIG. 17 is characterized in that an optical modulator 76 for performing intensity modulation according to an RZ signal having the same bit rate as that of each optical signal is additionally provided on the output side of the optical multiplexer 4.

Figure 18:
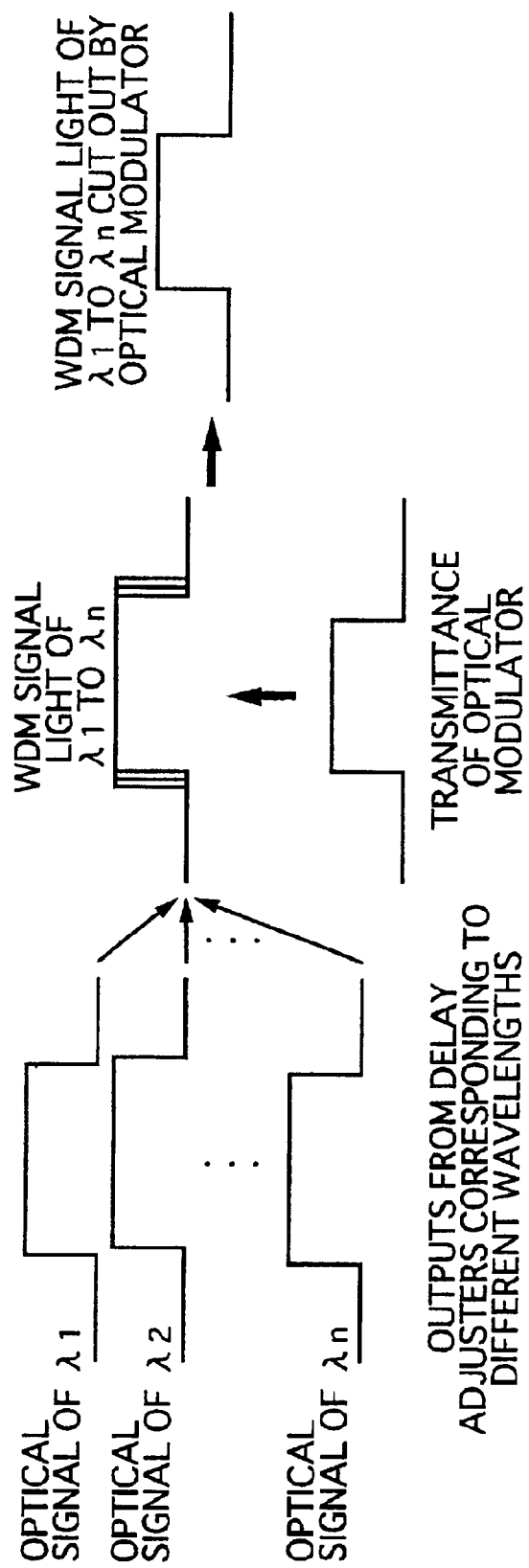
FIG. 18 is a schematic illustration of the operation principle of the device shown in FIG. 17.

The operation principle of the device shown in FIG. 17 will now be described with reference to FIG. 18. At the input of the optical modulator 76 (see FIG. 17), the phase difference between the optical signals of the WDM signal light is minimized in accordance with the operation of the basic configuration shown in FIG. 2. The WDM signal light thus processed is intensity-modulated by the optical modulator 76. As a modulating signal, the continuous codes of an RZ signal slightly smaller in duty than each optical signal may be used. The modulation by the optical modulator 76 can substantially nullify the optical power at a portion corresponding to a deviation in phase between the optical signals, thereby more reducing the modulation-phase difference in the WDM signal light. As the optical modulator 76, a Mach-Zehnder optical modulator or other optical modulators may be used.

Further, as the gain saturation device 66 (see FIG. 7, for example), a semiconductor optical amplifier or a DFB laser may be used. As the saturable absorption device 74 (see FIG. 10, for example), a reverse-biased semiconductor optical amplifier and multiple quantum well structure may be used.

Figure 19:
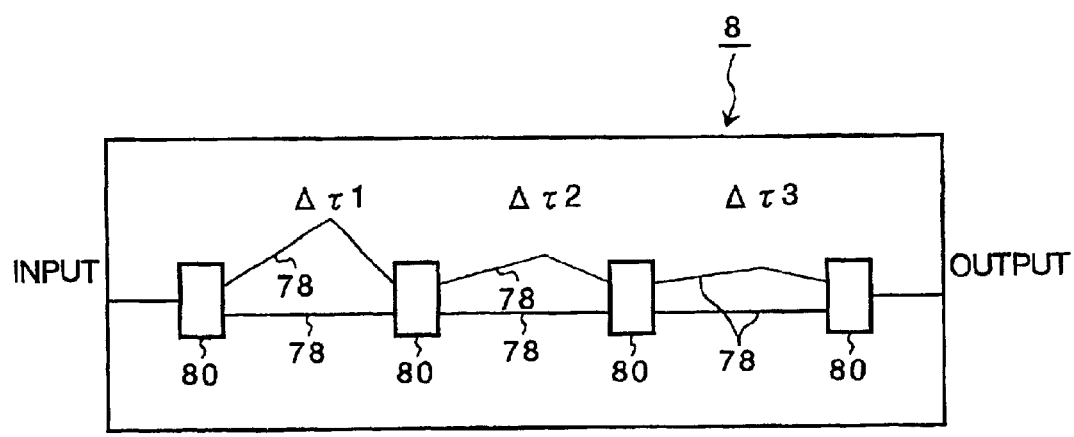
FIG. 19 is a plan view showing a preferred embodiment of the delay adjuster usable in carrying out the present invention.

FIG. 19 is a plan view showing a preferred embodiment of the delay adjuster usable in carrying out the present invention. In this preferred embodiment, the delay adjuster 8 includes at least two optical waveguides 78 having different optical path lengths, and at least two optical switches 80 for switching the at least two optical waveguides 78. More specifically, four optical switches 80 are used to switch six optical waveguides 78 as shown. By setting the delay time difference between the optical waveguides 78 arranged in parallel to Δτ1 to Δτn, the range of adjustment of the delay time can be changed.

With this configuration, a plurality of delay adjusters having an arrayed configuration can be integrated by using a glass waveguide or the like formed on an Si substrate.

Figure 20:
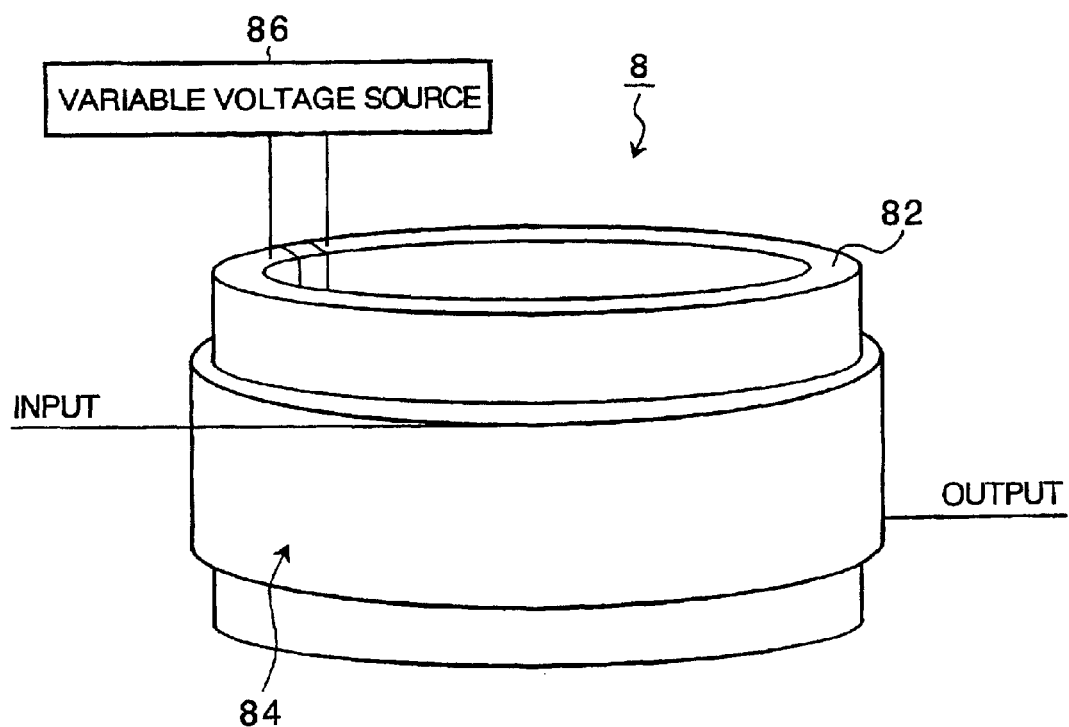
FIG. 20 is a perspective view showing another preferred embodiment of the delay adjuster usable in carrying out the present invention.

FIG. 20 is a perspective view showing another preferred embodiment of the delay adjuster usable in carrying out the present invention. In this preferred embodiment, the delay adjuster 8 includes a member 82 having a piezoelectric effect, an optical fiber 84 wound around the member 82, and a variable voltage source 86 for applying a voltage to the member 82. As the member 82, a cylindrical member formed of a piezoelectric material may be used. According to this preferred embodiment, the voltage to be applied to the member 82 can be changed by the variable voltage source 86, thereby changing the shape of the member 82 to change the delay time for the optical signal.

Additional information on the gain saturation device is described in detail in K. Inoue, "Suppression of signal fluctuation induced by crosstalk light in a gain saturated laser diode amplifier", IEEE Photon. Technol. Lett., vol.8, pp.458, 1996. Further, additional information on the saturable absorption devices are described in detail in I. Ogura, et al., "Picosecond all-optical gate using a saturable absorber in mode-locked laser diodes", IEEE Photon. Technol. Lett., vol.10, pp.603, 1998, O. Leclerc, et al., "Demonstration of high robustness to SNR impairment in 20 Gbit/s long-haul transmission using 1.5 μm saturable absorber", Electronics Letters, Vol. 36, pp.1944, 2000, and A. Hirano, et al., "10 Gbit/s all-optical pulse discriminator using a high-speed saturable absorber optical gate", ECOC'97, pp.86, 1997.

Figure 21:
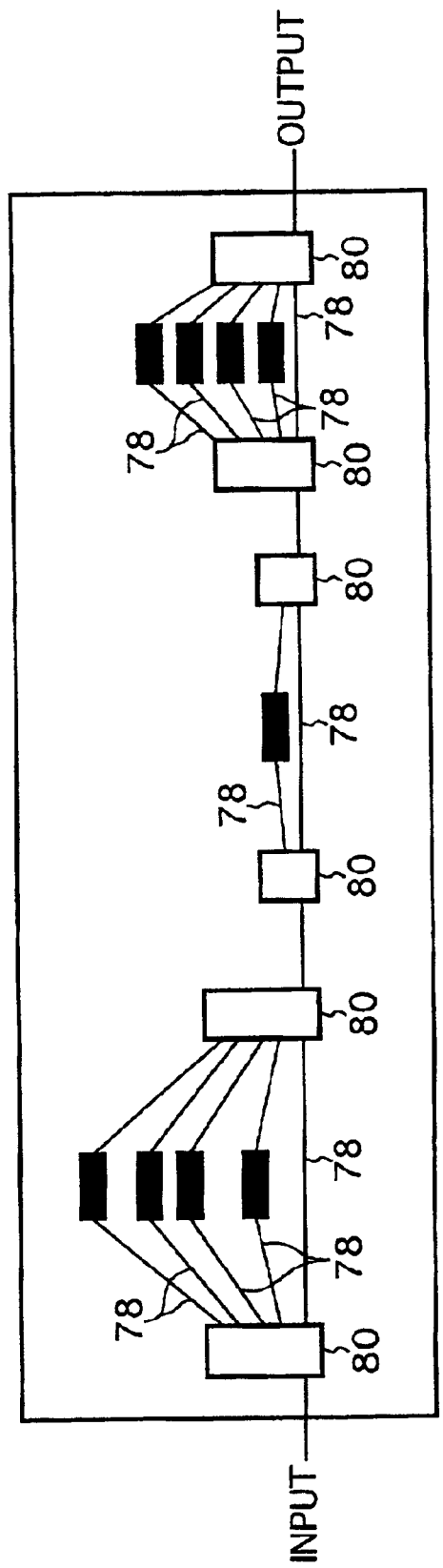
FIG. 21 is a plan view showing a further preferred embodiment of the delay adjuster usable in carrying out the present invention.

FIG. 21 is a plan view showing a further preferred embodiment of the delay adjuster usable in carrying out the present invention. In contrast to the preferred embodiment shown in FIG. 19, the preferred embodiment shown in FIG. 21 is characterized in that the number of optical waveguides 78 provided between adjacent optical switches 80 is increased to thereby increase the degree of freedom of the delay time obtainable.

In switching between the optical waveguides 78 providing different delay amounts by using the optical switches 80 in the delay adjuster, a large difference in delay amount causes an enlargement in pulse width of the optical signal in switching, resulting in large degradation of waveform. Further, if the difference in delay amount is largely deviated from an integral multiple of the wavelength of the optical signal input, the degradation of the optical signal due to interference becomes large.

To cope with this problem, this preferred embodiment is designed so that the difference in delay amount between the optical waveguides 78 providing the least different delay amounts is set to not greater than ⅓ of the reciprocal of the bit rate of the optical signal input, and that the difference in delay amount is set almost equal to an integral multiple of the wavelength of the optical signal input. That is, in switching between the optical waveguides 78 providing different delay amounts by using the optical switches 80, the difference in delay amount is set to not greater than ⅓ of the reciprocal of the bit rate of the optical signal input, thereby suppressing an enlargement in pulse width of the optical signal to not greater than 4/3 times. Accordingly, waveform degradation can be reduced. Further, since the difference in delay amount is set almost equal to an integral multiple of the wavelength of the optical signal input, the operation can be performed under the condition where the lights passing the two optical waveguides 78 intensity each other in switching. Accordingly, the degradation of the optical signal due to interference can be reduced.

Figure 22:
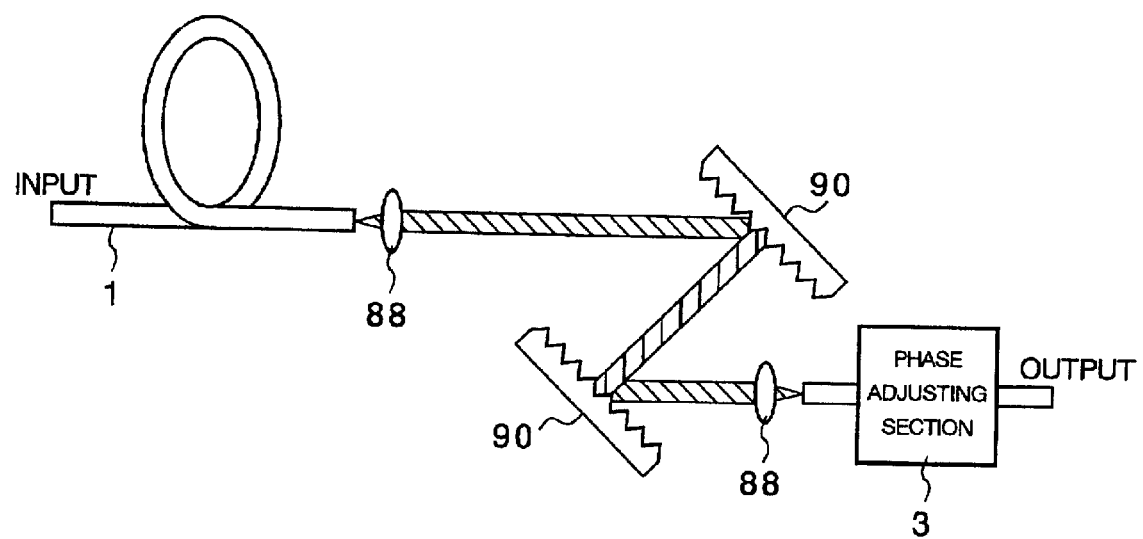
FIG. 22 is a schematic illustration showing the configuration of a pulse width compressing device applicable to the system shown in FIG. 1.

FIG. 22 is a schematic illustration showing the configuration of a pulse width compressing device applicable to the system shown in FIG. 1. A pair of lenses 88 are provided between the optical fiber 1 on the input side and the phase adjusting section 3 to form a nearly collimate optical system. Further, a pair of reflection type diffraction gratings 90 are provided in the nearly collimate optical system.

As in the previous preferred embodiment wherein the plural optical switches 80 and the plural optical waveguides 78 are combined in the delay adjuster, the pulse width of the optical signal inevitably increases in operating the optical switches 80, causing waveform degradation to some extent. To cope with this problem, the pulse width compressing device shown in FIG. 22 is designed so that the pulse width of the optical signal is preliminarily compressed before it is input into the phase adjusting section 3, thereby reducing the waveform degradation due to an increase in the pulse width.

In the case that the optical fiber 1 has normal dispersion, there occurs positive chirp associated with self-phase modulation in the optical fiber 1 (dynamic wavelength fluctuation such that the frequency increases toward the trailing edge of an optical pulse). By reflecting the optical signal thus positively chirped on the diffraction gratings 90, negative group-velocity dispersion (a phenomenon such that lower-frequency components travel slower) can be given to the optical signal, thus allowing the compression of the pulse width of the optical signal.

Figure 23:
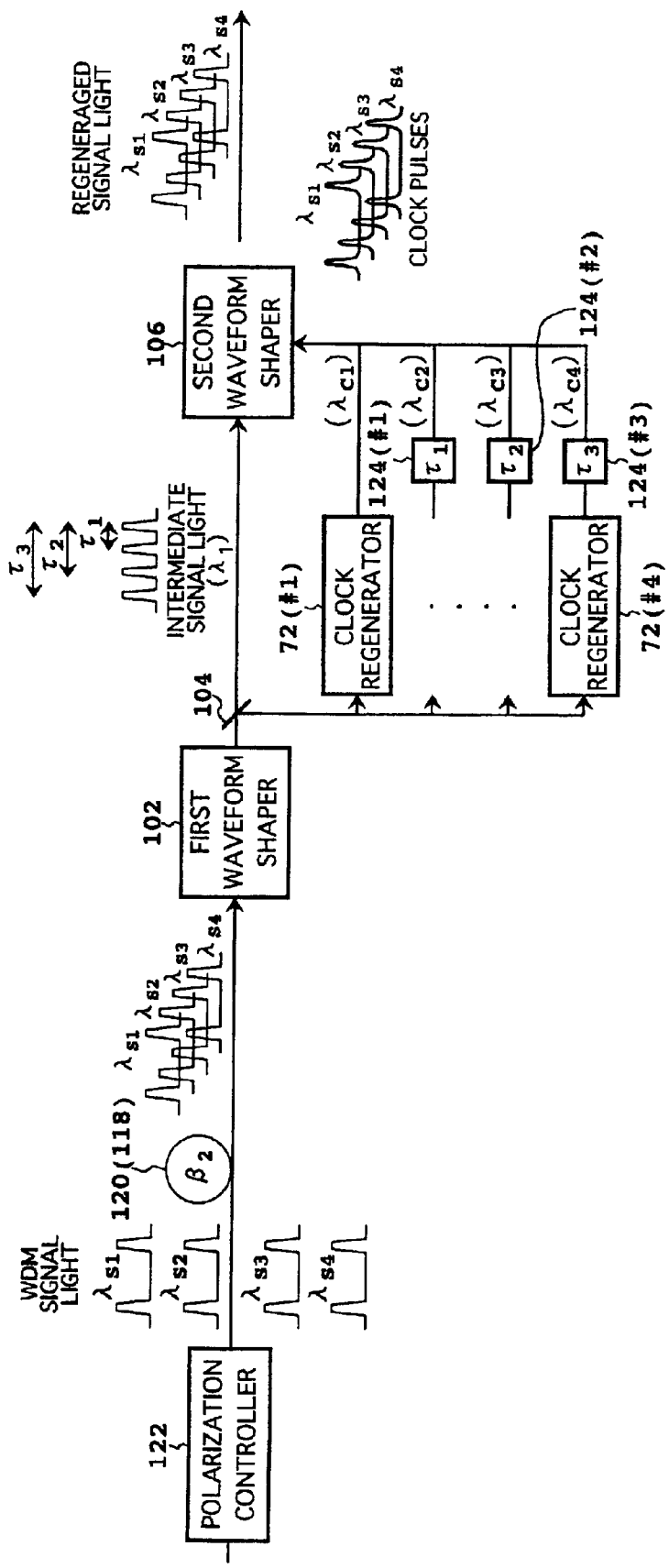
FIG. 23 is a block diagram showing a preferred embodiment of an all-optical regenerating section shown in FIG. 1.

FIG. 23 is a block diagram showing a preferred embodiment of the all-optical regenerating section 5 shown in FIG. 1. In this preferred embodiment, the all-optical regenerating section 5 includes a first waveform shaper 102 for accepting signal light and outputting intermediate signal light, an optical branch (e.g., optical coupler) 104 for dividing the intermediate signal light into first and second signal lights, a plurality of clock regenerators 72(#1) to 72(#4) for accepting the first signal light and outputting clock pulses, and a second waveform shaper 106 for accepting the second signal light and the clock pulses and outputting regenerated signal light synchronous with the clock pulses.

As each of the waveform shapers 102 and 106, a nonlinear optical loop mirror (NOLM) may be used.

With this basic configuration, 2R functions (reamplification and reshaping) at the optical level can be obtained by using the waveform shapers 102 and 106 or by further using an optical amplifier (not shown) in addition to the waveform shapers 102 and 106. Further, the clock pulses obtained in the clock regenerators 72(#1) to 72(#4) are supplied to the waveform shaper 106 to provide AND of the clock pulses and the second signal light, thereby effecting retiming at the optical level. Thus, 3R functions (2R functions plus retiming) at the optical level can be obtained.

The WDM signal light is supplied through a polarization controller 122 and an optical fiber 120 as an optical delay circuit 118 to the first waveform shaper 102. The optical fiber 120 has a chromatic dispersion β2, and changes each timing of the plural optical signals constituting the WDM signal light in the time domain. The polarization controller 122 is provided to cope with the possibility that the waveform shapers 102 and 106 may have polarization dependence, and functions to make constant each polarization state of the plural optical signals constituting the WDM signal light. The polarization controller 122 may be configured by applying an optical gate using XPM (cross-phase modulation) or XGM (cross-gain modulation) in an SOA (semiconductor optical amplifier) to each wavelength channel.

In the case of using the above-mentioned optical gate as the polarization controller 122, the polarization plane of the light to be output from the polarization controller 122 is fixed to the polarization plane of probe light in the optical gate, thereby coping with the polarization dependence of the waveform shapers 102 and 106. In this case, a polarization maintaining fiber (PMF) is preferably used as the optical fiber 120, so as to maintain the polarization plane of the light output from the polarization controller 122 and supply the light to the first waveform shaper 102. Further, in the case that the polarization maintaining ability of the optical fiber 120 is insufficient, the polarization controller 122 may be provided between the optical fiber 120 and the first waveform shaper 102.

The optical signals of the WDM signal light have different wavelengths $\lambda_{s1}$ to $\lambda_{s4}$. These optical signals are obtained by intensity modulation by optical pulses having temporal widths sufficiently shorter than data repetition time T. These optical signals are sequentially shifted in time by T/4 by the optical fiber 120. When the WDM signal light from the optical fiber 120 is supplied to the first waveform shaper 102, the wavelengths of all the four channels are converted into a single wavelength, so that the intermediate signal light output from the first waveform shaper 102 is an optical time division multiplexed signal (OTDM signal). Thus, the wavelength division multiplexed signal can be converted into the time division multiplexed signal (WDM/OTDM conversion).

While the four-channel wavelength division multiplexed signal is illustrated in this preferred embodiment, the number of WDM channels is not limited to four. For example, in the case that an N-channel wavelength division multiplexed signal (N is an integer greater than 1) is used, an N-channel optical time division multiplexed signal is obtained. In this case, N optical delay circuits are used and the time shift is set to T/N.

The first waveform shaper 102 has the above-mentioned WDM/OTDM conversion function to output an optical time division multiplexed signal having a single wavelength as the intermediate signal light. In the case that a NOLM is used as the waveform shaper 102, the wavelength of the intermediate signal light coincides with the wavelength $\lambda_1$ of probe light in the NOLM. The intermediate signal light output from the waveform shaper 102 is divided into first and second signal lights by an optical branch 104. The first signal light is supplied to each of the clock regenerators 72(#1) to 72(#4), and the second signal light is supplied to the second waveform shaper 106.

The clock regenerators 72(#1) to 72(#4) regenerate clock pulses having wavelengths $\lambda_{c1}$ to $\lambda_{c4}$ according to the first signal light, respectively. Particularly in this preferred embodiment, the wavelengths $\lambda_{c1}$ to $\lambda_{c4}$ are set equal to the wavelengths $\lambda_{s1}$ to $\lambda_{s4}$, respectively, so as to make the wavelength relation in regenerated signal light to be output from the second waveform shaper 106 coincide with the wavelength relation in the WDM signal light input. The frequency of the clock pulses from each clock regenerator corresponds to the speed (repetition frequency; corresponding to the bit rate) of each of the plural optical signals constituting the WDM signal light.

Optical delay circuits 124(#1) to 124(#3) are additionally provided between the clock regenerators 72(#2) to 72(#4) and the second waveform shaper 106, respectively. The optical delay circuits 124(#1) to 124(#3) give delay times τ1, to τ3 to the clock pulses output from the clock regenerators 72(#2) to 72(#4), respectively. The delay times τ1, τ2, and τ3 are set to a time interval from some first pulse to the second pulse, a time interval from the first pulse to the third pulse, and a time interval from the first pulse to the fourth pulse in the intermediate signal light, respectively.

With this configuration, the intermediate signal light (the second signal light) as an optical time division multiplexed signal can simultaneously switch the plural clock pulses in the second waveform shaper 106, thereby allowing 3R functions to the WDM signal light input into the first waveform shaper 102. Further, since the waveform shapers 102 and 106 are used commonly for the plural wavelength channels of the WDM signal light, the configuration of the device can be simplified to improve the reliability of the system.

Figure 24:
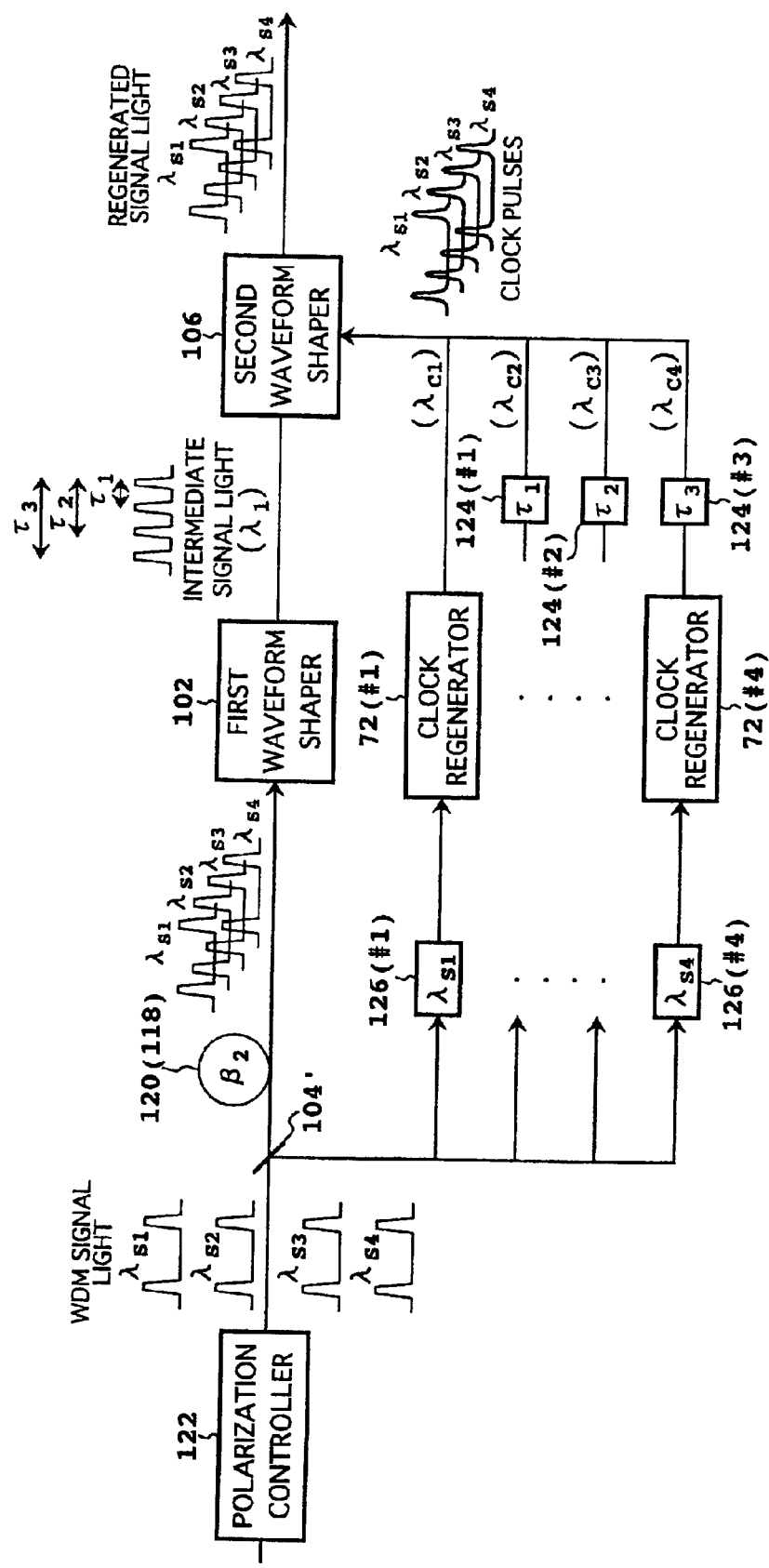
FIG. 24 is a block diagram showing another preferred embodiment of the all-optical regenerating section shown in FIG. 1.

FIG. 24 is a block diagram showing another preferred embodiment of the all-optical regenerating section 5 shown in FIG. 1. In contrast to the preferred embodiment shown in FIG. 23 in which each clock pulse is obtained according to the optical time division multiplexed signal as the intermediate signal light, the preferred embodiment shown in FIG. 24 is characterized in that each clock pulse is obtained according to WDM signal light to be subjected to waveform shaping.

In this preferred embodiment, an optical branch 104' is provided upstream of the first waveform shaper 102, more specifically, between the polarization controller 122 and the optical fiber 120, in place of the optical branch 104 shown in FIG. 23. A part of the WDM signal light branched by the optical branch 104' is supplied to a plurality of optical filters 126(#1) to 126(#4) corresponding to the number of wavelength channels of the WDM signal light. The optical filters 126(#1) to 126(#4) have pass bands respectively corresponding to the wavelengths $\lambda_{s1}$ to $\lambda_{s4}$ of the plural optical signals constituting the WDM signal light. Accordingly, the plural optical signals of the WDM signal light can be extracted by the optical filters 126(#1) to 126(#4), respectively.

The clock regenerators 72(#1) to 72(#4) can easily regenerate clock pulses according to the optical signals extracted by the optical filters 126(#1) to 126(#4), respectively.

According to this preferred embodiment, the intermediate signal light (the second signal light) as an optical time division multiplexed signal can simultaneously switch the plural clock pulses in the second waveform shaper 106 as in the preferred embodiment shown in FIG. 23, thereby allowing 3R functions to the WDM signal light input into the first waveform shaper 102.

According to the present invention as described above, it is possible to provide an optical signal processing device which can give stable temporal order to the modulation-phases of the plural optical signals of WDM signal light. Further, by combining this optical signal processing device and an all-optical regenerator, it is possible to provide an all-optical regenerative repeater which can be operated stably.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical signal processing device comprising:
   an optical demultiplexer having an input port and a plurality of output ports, said input port being adapted to accept WDM signal light obtained by wavelength division multiplexing a plurality of optical signals having different wavelengths;
   an optical multiplexer having an output port and a plurality of input ports;
   a plurality of optical paths for respectively connecting said plurality of output ports and said plurality of input ports;
   at least one delay adjuster provided on at least one of said plurality of optical paths;
   a detector for detecting the modulation-phase of at least one of said plurality of optical signals; and
   a controller for controlling said delay adjuster according to said modulation-phase detected by said detector, wherein said detector comprises:
      an optical filter for passing an optical signal having a reference wavelength;
      a circuit for regenerating a reference clock according to said optical signal passed through said optical filter;
      a tunable optical filter for passing an optical signal having an arbitrary wavelength;
      a circuit for regenerating a clock according to said optical signal passed through said tunable optical filter; and
      a phase comparator for comparing the phases of said reference clock and said clock.

2. An optical signal processing device comprising:
   an optical demultiplexer having an input port and a plurality of output ports, said input port being adapted to accept WDM signal light obtained by wavelength division multiplexing a plurality of optical signals having different wavelengths;
   an optical multiplexer having an output port and a plurality of input ports;
   a plurality of optical paths for respectively connecting said plurality of output ports and said plurality of input ports;
   at least one delay adjuster provided on at least one of said plurality of optical paths;
   a detector for detecting the modulation-phase of at least one of said plurality of optical signals; and
   a controller for controlling said delay adjuster according to said modulation-phase detected by said detector, wherein said detector comprises:
      a tunable optical filter for passing an optical signal having an arbitrary wavelength;
      a circuit for regenerating first and second clocks according to a first optical signal having a first wavelength passed through said tunable optical filter and a second optical signal having a second wavelength passed through said tunable optical filter, respectively; and
      a phase comparator for comparing the phases of said first and second clocks.

3. An optical signal processing device comprising:
   an optical demultiplexer having an input port and a plurality of output ports, said input port being adapted to accept WDM signal light obtained by wavelength division multiplexing a plurality of optical signals having different wavelengths;
   an optical multiplexer having an output port and a plurality of input ports;
   a plurality of optical paths for respectively connecting said plurality of output ports and said plurality of input ports;
   at least one delay adjuster provided on at least one of said plurality of optical paths;
   a detector for detecting the modulation-phase of at least one of said plurality of optical signals; and
   a controller for controlling said delay adjuster according to said modulation-phase detected by said detector, wherein said detector comprises:
      an optical filter for passing an optical signal having a reference wavelength;
      a circuit for generating a reference clock according to said optical signal passed through said optical filter;

a tunable optical filter for passing an optical signal having an arbitrary wavelength;

a circuit for regenerating a clock according to said optical signal passed through said tunable optical filter; and a phase comparator for comparing the phases of said reference clock and said clock.

4. An optical signal processing device comprising:

an optical demultiplexer having an input port and a plurality of output ports, said input port being adapted to accept WDM signal light obtained by wavelength division multiplexing a plurality of optical signals having different wavelengths;

an optical multiplexer having an output port and a plurality of input ports;

a plurality of optical paths for respectively connecting said plurality of output ports and said plurality of input ports;

at least one delay adjuster provided on at least one of said plurality of optical paths;

a detector for detecting the modulation-phase of at least one of said plurality of optical signals; and a controller for controlling said delay adjuster according to said modulation-phase detected by said detector, wherein said detector comprises:

a pulse light source for generating reference pulse light;

an optical filter for passing an optical signal having an arbitrary wavelength; and a gain saturation device for accepting said optical signal passed through said optical filter and said reference pulse light;

said controller comprising a circuit for controlling said delay adjuster so that the average power of light output from said gain saturation device is reduced.

5. An optical signal processing device according to claim 4, wherein said reference pulse light has a clock frequency 1/N (N is a natural number) times the clock frequency of each of said plurality of optical signals.

6. An optical signal processing device according to claim 4, further comprising means for detecting the distribution of pulse heights of each of said plurality of optical signals according to the average power of said light output from said gain saturation device.

7. An optical signal processing device comprising:

an optical demultiplexer having an input port and a plurality of output ports, said input port being adapted to accept WDM signal light obtained by wavelength division multiplexing a plurality of optical signals having different wavelengths;

an optical multiplexer having an output port and a plurality of input ports;

a plurality of optical paths for respectively connecting said plurality of output ports and said plurality of input ports;

at least one delay adjuster provided on at least one of said plurality of optical paths;

a detector for detecting the modulation-phase of at least one of said plurality of optical signals; and a controller for controlling said delay adjuster according to said modulation-phase detected by said detector, wherein said detector comprises:

a first optical filter for passing an optical signal having a first wavelength;

a second optical filter for passing an optical signal having a second wavelength; and a gain saturation device for accepting said optical signal passed through said first optical filter and said optical signal passed through said second optical filter;

said controller comprising a circuit for controlling said delay adjuster so that the average power of light output from said gain saturation device is reduced.

8. An optical signal processing device comprising:

an optical demultiplexer having an input port and a plurality of output ports, said input port being adapted to accept WDM signal light obtained by wavelength division multiplexing a plurality of optical signals having different wavelengths;

an optical multiplexer having an output port and a plurality of input ports;

a plurality of optical paths for respectively connecting said plurality of output ports and said plurality of input ports;

at least one delay adjuster provided on at least one of said plurality of optical paths;

a detector for detecting the modulation-phase of at least one of said plurality of optical signals; and a controller for controlling said delay adjuster according to said modulation-phase detected by said detector, wherein said detector comprises:

a pulse light source for generating reference pulse light;

an optical filter for passing an optical signal having an arbitrary wavelength; and a saturable absorption device for accepting said optical signal passed through said optical filter and said reference pulse light;

said controller comprising a circuit for controlling said delay adjuster so that the average power of light output from said saturable absorption device is increased.

9. An optical signal processing device according to claim 8, wherein reference pulse light has a clock frequency 1/N (N is a natural number) times the clock frequency of each of said plurality of optical signals.

10. An optical signal processing device according to claim 8, further comprising means for detecting the distribution of pulse heights of each of said plurality of optical signals according to the average power of said light output from said saturable absorption device.

11. An optical signal processing device comprising:

an optical demultiplexer having an input port and a plurality of output ports, said input port being adapted to accept WDM signal light obtained by wavelength division multiplexing a plurality of optical signals having different wavelengths;

an optical multiplexer having an output port and a plurality of input ports;

a plurality of optical paths for respectively connecting said plurality of output ports and said plurality of input ports;

at least one delay adjuster provided on at least one of said plurality of optical paths;

a detector for detecting the modulation-phase of at least one of said plurality of optical signals; and a controller for controlling said delay adjuster according to said modulation-phase detected by said detector, wherein said detector comprises:

a first optical filter for passing an optical signal having a first wavelength;

a second optical filter for passing an optical signal having a second wavelength; and a saturable absorption device for accepting said optical signal passed through said first optical filter and said optical signal passed through said second optical filter;

said controller comprising a circuit for controlling said delay adjuster so that the average power of light output from said saturable absorption device is increased.

* * * * *

UNITED STATES PATENT AND TRADEMARK OFFICE
CERTIFICATE OF CORRECTION

PATENT NO.      : 6,778,730 B2
DATED           : August 17, 2004
INVENTOR(S)     : Kazuo Hironishi It is certified that error appears in the above-identified patent and that said Letters Patent is hereby corrected as shown below:

Title page,
Item [56], References Cited, OTHER PUBLICATIONS, "Leclerc et al." first occurrence, delete "4 ' 40" and insert -- 4x40 --;
"Leclerc et al." second occurrence, delete "4=40" and insert -- 4x40 --

Signed and Sealed this

Twenty-first Day of December, 2004

JON W. DUDAS
*Director of the United States Patent and Trademark Office*